(12) United States Patent
Ono

(10) Patent No.: US 11,070,914 B2
(45) Date of Patent: Jul. 20, 2021

(54) CONTROLLER AND CONTROL METHOD

(71) Applicant: SONY CORPORATION, Tokyo (JP)

(72) Inventor: Eiji Ono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/638,885

(22) PCT Filed: Jul. 12, 2018

(86) PCT No.: PCT/JP2018/026294
§ 371 (c)(1),
(2) Date: Feb. 13, 2020

(87) PCT Pub. No.: WO2019/039128
PCT Pub. Date: Feb. 28, 2019

(65) Prior Publication Data
US 2020/0366986 A1 Nov. 19, 2020

(30) Foreign Application Priority Data
Aug. 22, 2017 (JP) .............................. JP2017-159334

(51) Int. Cl.
*H04R 3/02* (2006.01)
*G06F 3/16* (2006.01)
*G10L 21/0208* (2013.01)

(52) U.S. Cl.
CPC .............. *H04R 3/02* (2013.01); *G06F 3/165* (2013.01); *G10L 21/0208* (2013.01)

(58) Field of Classification Search
CPC ........ H04R 3/02; H04R 25/453; H04R 25/45; H04M 1/20
(Continued)

(56) References Cited

U.S. PATENT DOCUMENTS

| 4,149,032 A | 4/1979 | Peters |
| 5,442,712 A | 8/1995 | Kawamura et al. |

(Continued)

FOREIGN PATENT DOCUMENTS

| CA | 1108541 A1 | 9/1981 |
| CN | 102640518 A | 8/2012 |

(Continued)

OTHER PUBLICATIONS

International Search Report and Written Opinion of PCT Application No. PCT/JP2018/026294, dated Sep. 18, 2018, 11 pages of ISRWO.

(Continued)

*Primary Examiner* — Kile O Blair
(74) *Attorney, Agent, or Firm* — Chip Law Group

(57) ABSTRACT

Appropriate control corresponding to an ambient sound situation is executed for an audio processing system which receives an input of a sound via a microphone and outputs the sound via a speaker. For this purpose, a controller for the audio processing system which receives an input of a sound via the microphone and outputs the sound from the speaker includes a characteristic control unit and an analysis unit. The characteristic control unit is capable of selectively executing a plurality of control methods as an audio signal characteristic control method. The analysis unit analyzes the sound input via the microphone, and selects a control method executed by the characteristic control unit for the audio processing system in accordance with an analysis result.

16 Claims, 12 Drawing Sheets

(58) Field of Classification Search
 USPC .......................................................... 381/93
 See application file for complete search history.

(56) References Cited

U.S. PATENT DOCUMENTS

| | | | |
|---|---|---|---|
| 8,891,786 B1 | 11/2014 | Wang | |
| 2005/0078842 A1* | 4/2005 | Vonlanthen | H04R 25/43 |
| | | | 381/312 |
| 2012/0281855 A1 | 11/2012 | Kitago et al. | |
| 2015/0172815 A1 | 6/2015 | Park et al. | |

FOREIGN PATENT DOCUMENTS

| | | |
|---|---|---|
| CN | 105814909 A | 7/2016 |
| DE | 2906011 A1 | 11/1979 |
| EP | 0599450 A2 | 6/1994 |
| EP | 2595312 A1 | 5/2013 |
| GB | 2020511 A | 11/1979 |
| JP | 64-146511 A | 11/1979 |
| JP | 03-139097 A | 6/1991 |
| JP | 08-223684 A | 8/1996 |
| JP | 2009-033309 A | 2/2009 |
| JP | 2009-225101 A | 10/2009 |
| JP | 4567804 B1 | 10/2010 |
| JP | 2011-114758 A | 6/2011 |
| JP | 2016-541222 A | 12/2016 |
| KR | 10-2016-0099640 A | 8/2016 |
| WO | 2009/116521 A1 | 9/2009 |
| WO | 2011/065003 A1 | 6/2011 |
| WO | 2015/094860 A1 | 6/2015 |

OTHER PUBLICATIONS

Extended European Search Report of EP Application No. 18848693.0, dated Sep. 11, 2020, 09 pages.

* cited by examiner

CONTROLLER AND CONTROL METHOD

CROSS REFERENCE TO RELATED APPLICATIONS

This application is a U.S. National Phase of International Patent Application No. PCT/JP2018/026294 filed on Jul. 12, 2018, which claims priority benefit of Japanese Patent Application No. JP 2017-159334 filed in the Japan Patent Office on Aug. 22, 2017. Each of the above-referenced applications is hereby incorporated herein by reference in its entirety.

TECHNICAL FIELD

The present technology relates to a controller, a control method, and a program, and more particularly to a technology applicable to audio signal characteristic control for an audio processing system which receives an input of a sound via a microphone and outputs the sound via a speaker.

BACKGROUND ART

Various types of headphone, such as a head band type, a canal type, and an ear-hanging type, have been widely used. It is assumed in the present disclosure that so-called "earphones" are also regarded as a type of headphones.

In these types of headphone, a type which includes a microphone disposed near a speaker is known. This microphone concentrates ambient environmental sounds. Input audio signals generated by this microphone are used for a noise cancelling process performed during listening to music or the like, or for outputting ambient sounds from a speaker in conjunction with music or the like, for example.

PTL 1 described below discloses a technology capable of analyzing ambient sounds, and switching signal characteristics during generation of noise reduction signals on the basis of a result of the analysis.

CITATION LIST

Patent Literature

[PTL 1]
Japanese Patent Laid-open No. 2009-33309

SUMMARY

Technical Problem

The technology disclosed in PTL 1 described above concentrates ambient sounds using a microphone, analyzes the sounds, and changes signal characteristics at an audio processing system provided for music reproduction or the like in accordance with the analysis to perform appropriate noise cancelling. There are technologies, like the foregoing example, which are configured to obtain appropriate results by switching signal characteristics in accordance with analysis results of ambient sounds. However, appropriate results are difficult to achieve in some cases only by controlling signal characteristics in accordance with situations of ambient sounds.

For example, a howling reduction operation or the like can be performed by changing signal characteristics through gain control, filter passband control or the like in accordance with ambient sounds using a certain algorithm. However, depending on ambient sound situations, there may arise problems such as a case where an appropriate result is difficult to obtain by said algorithm, and a case where a malfunction of signal characteristic control is easily caused.

Accordingly, the present disclosure provides a technology capable of executing more appropriate signal characteristic control not by simply switching signal characteristics, but by switching a manner of a signal characteristic change in accordance with an analysis result of ambient sounds.

Solution to Problem

A controller according to the present technology includes: a characteristic control unit capable of selectively executing a plurality of control methods as an audio signal characteristic control method for an audio processing system provided for inputting a sound via a microphone and outputting the sound via a speaker; and an analysis unit that analyzes the sound input via the microphone, and selects a control method executed by the characteristic control unit for the audio processing system on the basis of an analysis result.

This controller performs control for changing audio signal characteristics for the audio processing system which receives an input of a sound via the microphone and outputs the sound via the speaker. In this case, the plurality of control methods can be selectively executed as control for changing audio signal characteristics, and the control method to be executed is selected on the basis of the analysis result of ambient sounds. The control method is an audio signal characteristic control algorithm for particular purposes, and indicates a method as a manner for changing audio signal characteristics. Accordingly, a plurality of manners of an audio signal characteristic change can be provided for a certain purpose, and one of these manners is selected and executed. That is, the controller does not simply switch the audio signal characteristics, but switches the manner of the audio signal characteristic change in accordance with the analysis result of the ambient sounds.

According to the controller of the present technology described above, it is considered that the characteristic control unit is capable of selectively executing a plurality of audio signal characteristic control methods for howling reduction.

For example, howling is generated depending on a positional relationship between a microphone and a speaker, a state of a loop route, a behavior of a user and other conditions. The characteristic control unit is capable of executing a plurality of the audio signal characteristic control methods for howling reduction, and selects one of the plurality of control methods in accordance with the analysis result obtained by the analysis unit concerning the ambient sound situation.

According to the controller of the present technology described above, it is considered that the characteristic control unit is capable of executing at least a first process and a second process as the audio signal characteristic control method for howling reduction.

It is further considered that the first process executes signal characteristic control for howling reduction in a condition where a detection level of an audio signal input via the microphone exceeds a first threshold, and that the second process executes the signal characteristic control for howling reduction in a condition where a detection level of the audio signal input via the microphone exceeds a second threshold higher than the first threshold.

This configuration is adopted for a following reason. The first process is suited for a howling reduction process exercised in a relatively quiet case where the ambient noise level is relatively low, while the second process is suited for a howling reduction process exercised in a case where the ambient noise level is relatively high.

According to the controller of the present technology described above, it is considered that the first process is a process that outputs an instruction for howling reduction to the audio processing system when the detection level exceeds the first threshold and is determined to have an increasing tendency.

More specifically, the first process issues a howling reduction instruction such as a gain decrease by a predetermined amount when the sound level is increasing in a case of determination of howling generation in excess of the first threshold.

According to the controller of the present technology described above, it is considered that the second process is a process that outputs an instruction for howling reduction to the audio processing system in a case where the detection level exceeds the second threshold without detection of a level drop more than a predetermined level range for a predetermined period.

More specifically, in the second process, it is determined whether the input sound level is a temporary high level or a continuous level increase caused by howling in a case where the input sound level exceeds the second threshold in a noisy environment. In a case of a possibility of howling, a howling reduction instruction is issued.

According to the controller of the present technology described above, it is considered that the first process compares a signal level of a first band component of the audio signal input via the microphone with the first threshold, and that the second process compares a signal level of a second band component of the audio signal input via the microphone with the second threshold.

More specifically, the signal levels of the particular bands where howling is easily generated (first band and second band) are extracted by filtering, and handled as targets compared with the first threshold or the second threshold. Note that the band ranges of the first band and the second band may be the same band range, or may be different ranges defined by tuning corresponding to the first process and the second process.

According to the controller of the present technology described above, it is considered that the first process compares a signal envelope level of a first band component of the audio signal input via the microphone with the first threshold, and that the second process compares a signal envelope level of a second band component of the audio signal input via the microphone with the second threshold.

More specifically, signals in the particular bands where howling is easily generated (first band and second band) are extracted by filtering. Thereafter, envelope wave detection is performed, and the envelope level thus obtained is compared with the first threshold or the second threshold.

According to the controller of the present technology described above, it is considered that the analysis unit uses, for a selection process of selecting the control method performed by the characteristic control unit, a result of a comparison between an audio signal level input via the microphone and a noise determination threshold.

The noise determination threshold is set to an appropriate value as a threshold for determining whether the current environment is a quiet ambient environment or a noisy environment. For example, the control method is switched in response to a state that an input sound exceeds the noise determination threshold.

According to the controller of the present technology described above, it is considered that the analysis unit uses, for a selection process of selecting the control method performed by the characteristic control unit, a result of a comparison between a signal level of a predetermined band component of the audio signal input via the microphone and a noise determination threshold.

For example, the howling band in the input audio signal is extracted, and the signal level of the band is compared with the noise determination threshold.

According to the controller of the present technology described above, it is considered that the analysis unit uses, for a selection process of selecting the control method performed by the characteristic control unit, a result of a comparison between a signal envelope level of a predetermined band component of the audio signal input via the microphone and a noise determination threshold.

More specifically, signals in the particular bands where howling is easily generated are extracted by filtering. Thereafter, envelope wave detection is performed, and the envelope level thus obtained is compared with the noise determination threshold.

According to the controller of the present technology described above, it is considered that the analysis unit uses, for a selection process of selecting the first process and the second process performed by the characteristic control unit, a result of a comparison between an audio signal level input via the microphone and a noise determination threshold lower than the first threshold.

More specifically, a relationship "the noise determination threshold<the first threshold<the second threshold" is established.

According to the controller of the present technology described above, it is considered that the analysis unit uses, for determination of switching from the first process to the second process by the characteristic control unit, a result of a comparison between a signal level of the first band component of the audio signal input via the microphone and a noise determination threshold.

More specifically, the analysis unit determines the ambient environment on the basis of a level of a signal band common to the signal band for determining howling generation in the first process performed by the characteristic control unit.

According to the controller of the present technology described above, it is considered that audio signals generated in a plurality of channels and obtained via a plurality of microphones are input to the analysis unit, and that the analysis unit issues an instruction for switching the control method of the characteristic control unit in a case where all of audio signal levels of respective channels exceed a noise determination threshold.

In a case where an ambient sound is input via an L-channel and R-channel stereo microphone, for example, the analysis determines that the current environment is a noisy environment on the basis of a state that the input sound exceeds the noise determination threshold for both the L and R channels, and selects a control method suited for the noisy environment.

According to the controller of the present technology described above, it is considered that audio signals generated in a plurality of channels and obtained via a plurality of microphones are input to the analysis unit, and that the analysis unit issues an instruction for switching the control method of the characteristic control unit in a case where all of audio signal levels of respective channels become equal to or lower than a noise determination threshold for a predetermined time or longer.

For example, it is determined that the noisy environment has ended when the input sound has become the noise determination threshold or lower for both the L and R channels for the predetermined time. In this case, a control method suited for a quiet environment is selected.

A control method according to the present technology is a method executed by a controller. The method includes: a procedure of analyzing a sound input via a microphone, and selecting, from a plurality of control methods on the basis of a result of the analysis, an audio signal characteristic control method for an audio processing system provided for inputting the sound via the microphone and outputting the sound via a speaker; and a procedure of performing audio signal characteristic control for the audio processing system using the selected control method.

In this case, the manner of the audio signal characteristic change (algorithm of audio signal characteristic control) is switched in accordance with the analysis result of the ambient sounds.

A program according to the present technology is a program under which a computer apparatus executes processes of the respective procedures described above. In this case, the controller of the present disclosure is implemented using an arithmetic processing unit such as a microcomputer.

Advantageous Effects of Invention

According to the present technology, a control method more suited for an ambient sound situation can be selected to implement audio signal characteristic control for an audio processing system. Accordingly, higher quality acoustic control such as howling reduction is achievable.

Note that advantageous effects to be produced are not limited to the advantageous effects described herein, but may include any of advantageous effects described in the present disclosure.

DESCRIPTION OF EMBODIMENTS

Figure 1:
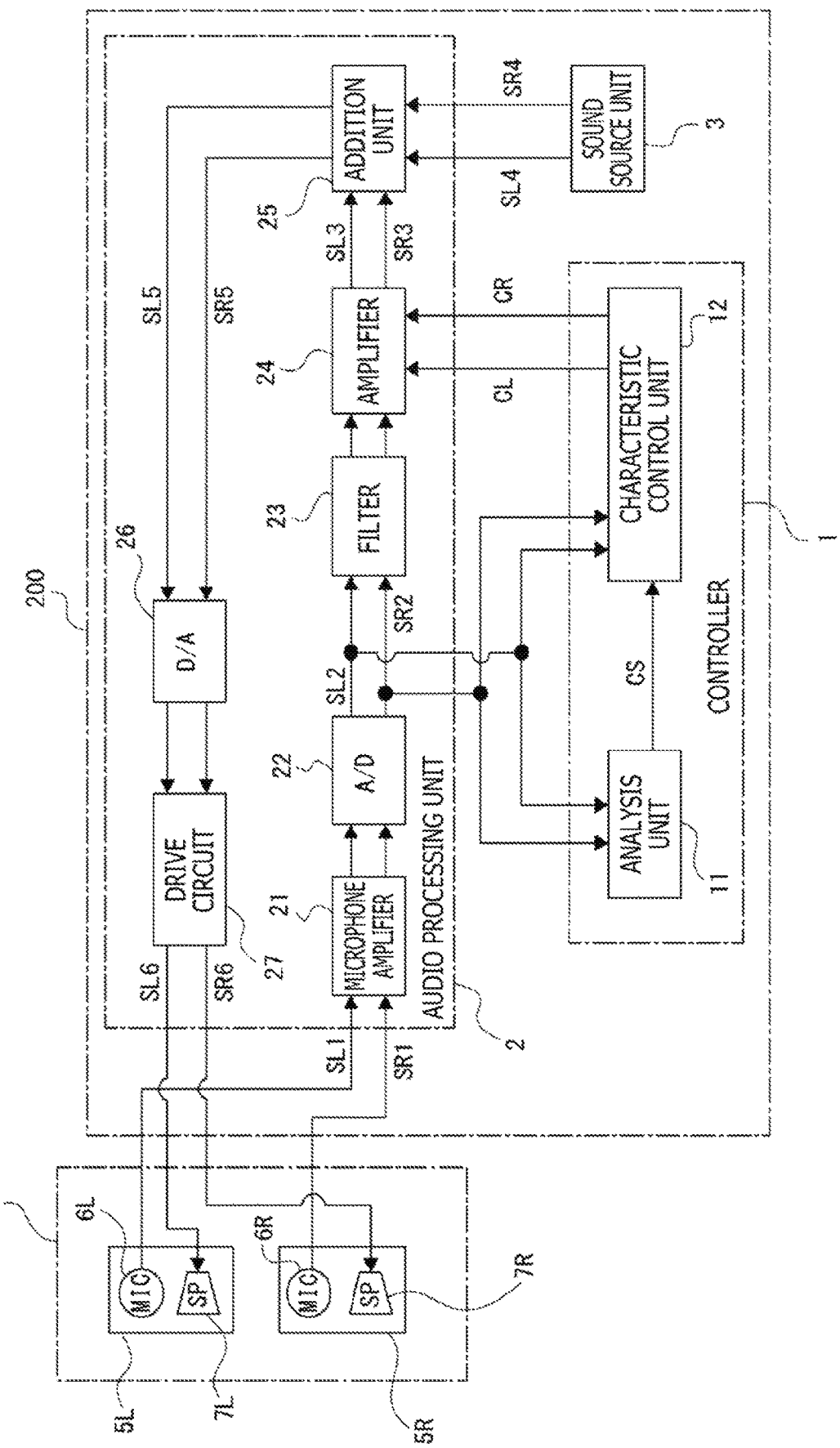
FIG. 1 is a block diagram of a headphone and an audio player according to embodiments of the present technology.

Embodiments will be hereinafter described in a following order.
1. Configuration Example of Headphone and Audio Player
2. Controller Configuration of First Embodiment
3. Howling Reduction Process
4. Controller Configuration of Second Embodiment
5. Application Examples of Headphone and Audio Player
6. Summary and Modified Examples 1. Configuration Example of Headphone and Audio Player FIG. 1 depicts a configuration of a headphone 100 and an audio player 200 constituting an audio reproduction system including a controller 1 according to embodiments.

The headphone 100 and the audio player 200 constitute a stereo audio reproduction system having an L (left) channel and an R (right) channel.

A user wearing the headphone 100 is capable of listening to music or the like reproduced by the audio player 200 using the audio reproduction system constituted by the headphone 100 and the audio player 200. The user further listens to ambient sounds output from the headphone 100 together with the music or the like. Accordingly, the system allows the user to naturally hear external sounds while listening to the music.

While not depicted in the figure, the headphone 100 and the audio player 200 are components separated from each other, for example. An electric connection depicted in FIG. 1 is made by connecting a stereo plug provided at a code tip of the headphone 100 to a stereo jack of the audio player 200.

However, needless to say, such a mode which connects the headphone 100 to the audio player 200 in a non-detachable manner may be adopted.

The headphone 100 includes an L channel speaker unit for a left ear (hereinafter, referred to as "L unit") 5L, and an R channel speaker unit for a right ear (hereinafter, referred to as "R unit") 5R.

The L unit 5L includes a speaker 7L for an audio output of the L channel, and a microphone 6L. Accordingly, the L unit 5L constitutes a microphone/speaker integrated unit.

The R unit 5R includes a speaker 7R for an audio output of the R channel, and a microphone 6R. The R unit 5R similarly constitutes a microphone/speaker integrated unit.

The microphones 6L and 6R concentrate ambient sounds around a user wearing the headphone 100.

The audio player 200 includes a controller 1, an audio processing unit 2, and a sound source unit 3. Each of the controller 1 and the audio processing unit 2 is constituted by a microcomputer, a DSP (Digital Signal Processor) or the like. The controller 1 and the audio processing unit 2 may be components separated from each other, or may be constituted by an integrated (e.g., one-chip) microcomputer or the like.

The audio processing unit 2 includes a microphone amplifier 21, an A/D converter 22, a filter 23, an amplifier 24, an addition unit 25, a D/A converter 26, and a drive circuit 27.

Audio signals SL1 and SR1 indicating ambient sounds are output from the microphones 6L and 6R of the headphone 100 and input to the microphone amplifier 21.

The microphone amplifier 21 amplifies the audio signals SL1 and SR1 of the L channel and the R channel to raise voltages of the audio signals SL1 and SR1 to sufficient voltages for easy handling.

Each of the amplified audio signals SL1 and SR1 is converted into digital data by the A/D converter 22 provided in a following stage. The audio signals of the respective channels in the form of digital data are expressed as audio signals SL2 and SR2.

The audio signals SL2 and SR2 are processed by the filter 23 and the amplifier 24 to achieve natural reproduction of the audio signals SL2 and SR2 as ambient sounds (sounds outside the headphone 100) from the speakers 7L and 7R. For example, the filter 23 performs an equalizing process or the like. The amplifier 24 performs level adjustment or the like to give a speaker output at an appropriate volume.

These audio signals obtained after the filtering and the amplification are expressed as audio signals SL3 and SR3. The audio signals SL3 and SR3 are supplied to the addition unit 25.

Audio signals SL4 and SR4 are further supplied to the addition unit 25 from the sound source unit 3.

The sound source unit 3 includes a storage unit which stores content of a reproduction target such as music, and a read circuit for reading the content. The audio signals SL4 and SR4 generated in the L channel and the R channel and indicating music content or the like are read from the storage unit in accordance with a user operation or the like performed through a not-depicted user interface, and are supplied to the addition unit 25.

The addition unit 25 adds the audio signal SL3 and the audio signal SL4 for the L channel, and adds the audio signal SR3 and the audio signal SR4 for the R channel, and outputs respective addition results as audio signals SL5 and SR5.

Note that the sound source unit 3 includes a not-depicted music reproduction amplifier. Volumes of the audio signals SL4 and SR4 can be adjusted by said amplifier in accordance with a user operation or the like. The addition unit 25 therefore adds the audio signals SL4 and SR4 to the audio signals SL3 and SR3, respectively, after volume adjustment of the audio signals SL4 and SR4 by the sound source unit 3.

The respective audio signals SL5 and SR5 output from the addition unit 25 are converted into analog audio signals by the D/A converter 26, and then amplified by the drive circuit 27, and supplied to the speakers 7L and 7R as audio signals SL6 and SR6 for speaker driving.

As a result, an audio output containing a mixture of music or the like and the ambient sounds is given from the speakers 7L and 7R to the user for listening. In other words, the user can hear external sound naturally while listening to music.

Note that a delay time from an audio input via the microphones 6L and 6R to an output from the speakers 7L and 7R needs to be reduced to achieve more natural reproduction of external sounds.

Moreover, gains of the filter 23 and the amplifier 24 need to be appropriately adjusted to achieve natural reproduction of external sounds.

Appropriate settings which meet these necessities are established for respective parts of the audio processing unit 2 to provide an ambient sound output for the user without giving a sense of incongruity.

According to the present embodiment, the controller 1 is provided on the audio player 200 side of the audio reproduction system thus configured, for example. The controller 1 includes an analysis unit 11 and a characteristic control unit 12.

The characteristic control unit 12 is capable of selectively executing a plurality of control methods as audio signal characteristic control methods for the audio processing unit 2 which receives sounds input via the microphones 6L and 6R and outputs the sounds via the speakers 7L and 7R.

More specifically, the characteristic control unit 12 is capable of selectively executing a plurality of audio signal characteristic control methods for howling reduction. In this case, the characteristic control unit 12 has a plurality of audio signal characteristic control algorithms for howling reduction, and is capable of selectively executing these algorithms. In other words, the characteristic control unit 12 is capable of switching a manner of changing the signal characteristics.

The analysis unit 11 analyzes sounds input via the microphones 6L and 6R (audio signals SL2 and SR2 in the example of FIG. 1), and selects a control method (processing algorithm for howling reduction) executed by the characteristic control unit 12 for the audio processing unit 2 in accordance with an analysis result.

According to the example of FIG. 1, the analysis unit 11 receives an input of the audio signals SL2 and SR2, and performs an analysis process for analyzing ambient sounds. For example, the analysis unit 11 detects an ambient noise level. Thereafter, the analysis unit 11 outputs a switching signal CS to the characteristic control unit 12 in accordance with an analysis result thus obtained.

The characteristic control unit 12 switches an audio signal characteristic control system to be executed in accordance with the switching signal CS. In addition, the characteristic control unit 12 receives an input of the audio signals SL2 and SR2, and outputs an instruction signal CL for the L channel, and an instruction signal CR for the R channel to the amplifier 24 to reduce howling in a case of howling generation. It is assumed herein that the respective instruction signals are gain instruction signals.

The amplifier 24 performs gain control or the like for the L channel in accordance with the instruction signal CL. In addition, the amplifier 24 performs gain control or the like for the R channel in accordance with the instruction signal CR.

According to the present embodiment, the gain instruction is issued to the amplifier 24 to perform the audio signal characteristic control for howling reduction. However, note that an instruction signal to the filter 23 may be issued as will be described below, for example.

Figure 2:
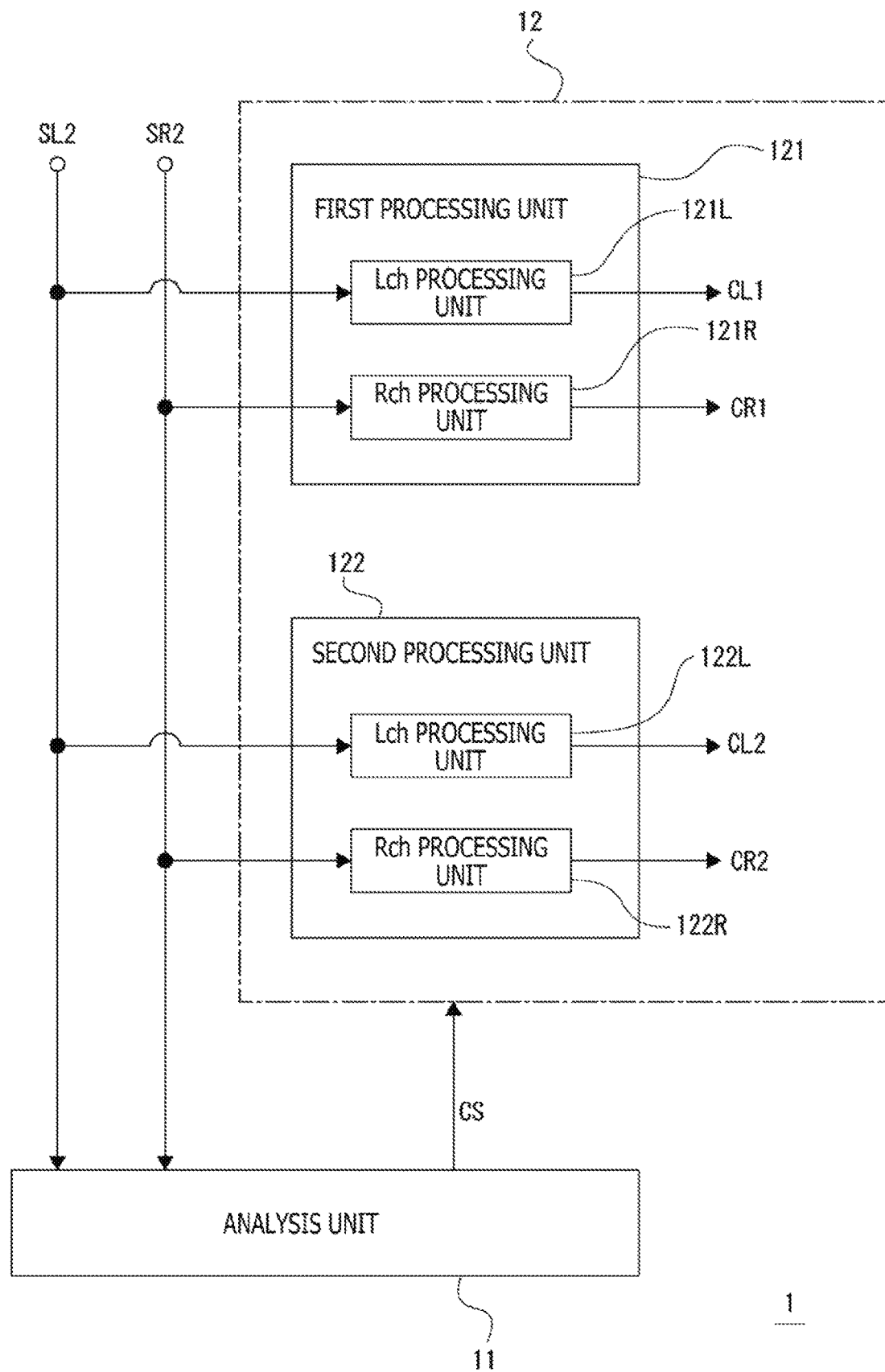
FIG. 2 is a block diagram of a controller according to the embodiments.

FIG. 2 depicts the analysis unit 11 and the characteristic control unit 12.

The characteristic control unit 12 includes a first processing unit 121 and a second processing unit 122. Note that each of the first processing unit 121 and the second processing unit 122 represents a processing algorithm constituted by a software program for howling reduction. However, each of the first processing unit 121 and the second processing unit 122 may be constituted by a hardware circuit.

The first processing unit 121 includes an L-channel processing unit 121L and an R-channel processing unit 121R. The L-channel processing unit 121L receives an input of the audio signal SL2, detects whether or not howling has been generated in the audio signal SL2, and outputs a gain decrease instruction signal CL1 in accordance with detection of howling generation. The R-channel processing unit 121R receives an input of the audio signal SR2, detects whether or not howling has been generated in the audio signal SR2, and outputs a gain decrease instruction signal CR1 in accordance with detection of howling generation.

Similarly, the second processing unit 122 includes an L-channel processing unit 122L and an R-channel processing unit 122R. The L-channel processing unit 122L receives an input of the audio signal SL2, detects whether or not howling has been generated in the audio signal SL2, and outputs a gain decrease instruction signal CL2 in accordance with detection of howling generation. The R-channel processing unit 122R receives an input of the audio signal SR2, detects whether or not howling has been generated in the audio signal SR2, and outputs a gain decrease instruction signal CR2 in accordance with detection of howling generation.

However, the howling detection method and the instruction details of the instruction signals CL2 and CR2 for the L-channel processing unit 122L and the R-channel processing unit 122R are different from the howling detection method and the instruction details of the instruction signals CL1 and CR1 for the L-channel processing unit 121L and the R-channel processing unit 121R of the first processing unit.

The analysis unit 11 receives an input of the audio signals SL2 and SR2, analyzes the audio signals SL2 and SR2, and determines whether or not the current state is a noisy state. Thereafter, the analysis unit 11 outputs the switching signal CS to the characteristic control unit 12 in accordance with a result of the determination.

The characteristic control unit 12 therefore switches operation between the first processing unit 121 and the second processing unit 122 in accordance with the switching signal CS. In a period of selection of the first processing unit 121, the instruction signals CL1 and CR1 generated from the first processing unit 121 are output to the amplifier 24 as the instruction signals CL and CR in FIG. 1. In a period of selection of the second processing unit 122, the instruction signals CL2 and CR2 generated from the second processing unit 122 are output to the amplifier 24 as the instruction signals CL and CR in FIG. 1.

2. Controller Configuration of First Embodiment

The configuration of the controller 1 according to a first embodiment will be described in more detail.

Figure 3:
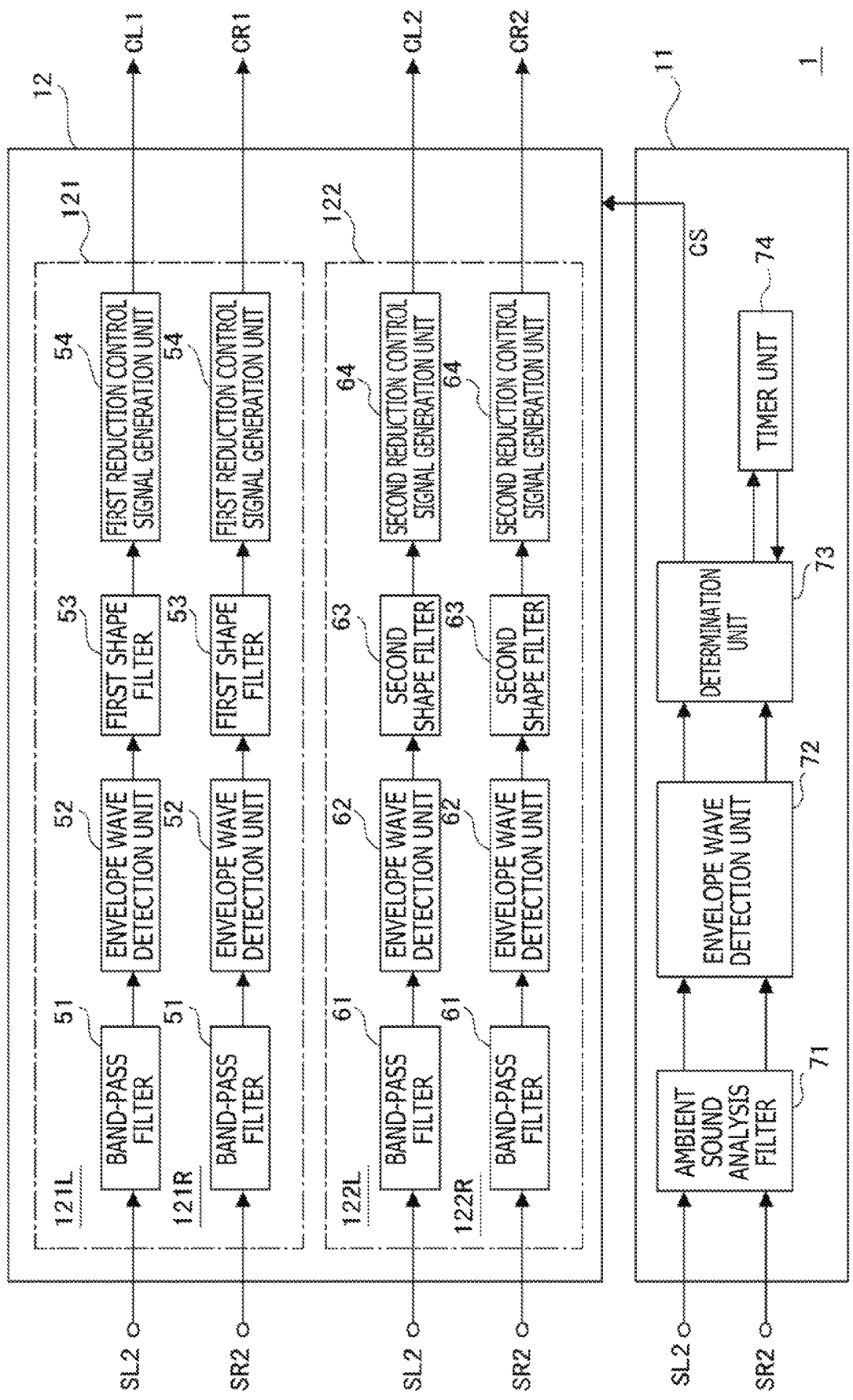
FIG. 3 is a block diagram depicting processing functions of a controller according to a first embodiment.

FIG. 3 depicts processing functions of the first processing unit 121, the second processing unit 122, and the analysis unit 11 in FIG. 2 (arithmetic functions implemented by software).

In FIG. 3, the first processing unit 121 of the characteristic control unit 12 includes a band-pass filter 51, an envelope wave detection unit 52, a first shape filter 53, and a first reduction control signal generation unit 54 in the L-channel processing unit 121L.

Similarly, the first processing unit 121 further includes the band-pass filter 51, the envelope wave detection unit 52, the first shape filter 53, and the first reduction control signal generation unit 54 in the R-channel processing unit 121R.

The band-pass filter 51 is a band-pass filter which transmits a howling band of the audio signal SL2 (or SR2). More specifically, the band-pass filter 51 is a filter which transmits only a band where howling is easily generated in accordance with characteristics of the headphone 100 of a microphone/speaker integrated type. This extraction of only the band where howling is easily generated using the band-pass filter 51 can reduce malfunctions of howling reduction caused by erroneous detection of sounds other than howling as howling.

The envelope wave detection unit 52 performs a peak hold process for an output of the band-pass filter 51 for an appropriate period to generate and output an envelope signal (envelope).

The first shape filter 53 detects an inclination of the envelope during generation of howling sound. This determination of the inclination of the envelope increases howling determination accuracy, thereby reducing malfunctions of howling reduction caused by sounds other than howling.

Note that the inclination of the envelope during generation of howling is different for each headphone. Accordingly, it is preferable that the inclination is measured and determined for each model of headphones, or for each unit of headphones.

The first reduction control signal generation unit 54 determines howling generation on the basis of the inclination determination by the first shape filter 53 or a result of comparison with a fixed threshold (first threshold th1), and generates the instruction signal CL1 (or CR1).

The first reduction control signal generation unit 54 outputs the instruction signal CL1 (or CR1) which instructs a small and uniform stepwise decrease of the gain of the amplifier 24 when the envelope signal exceeds the set first threshold th1. This point will be further described below.

The L-channel processing unit 121L thus configured monitors the audio signal SL2, and outputs the instruction signal CL1 which instructs a gain decrease for howling reduction during howling generation in the L channel. The instruction signal CL1 is a control signal for an L-channel gain of the amplifier 24.

The R-channel processing unit 121R monitors the audio signal SR2, and outputs the instruction signal CR1 which instructs a gain decrease for howling reduction during howling generation in the R channel. The instruction signal CR1 is a control signal for an R-channel gain of the amplifier 24.

Accordingly, the first processing unit 121 performs a similar howling reduction process independently for each of the L channel and the R channel.

The second processing unit 122 of the characteristic control unit 12 includes a band-pass filter 61, an envelope wave detection unit 62, a second shape filter 63, and a second reduction control signal generation unit 64 in the L-channel processing unit 122L.

Similarly, the second processing unit 122 further includes the band-pass filter 61, the envelope wave detection unit 62, the second shape filter 63, and the second reduction control signal generation unit 64 in the R-channel processing unit 122R.

Similarly to the band-pass filter 51 described above, the band-pass filter 61 is a band-pass filter which transmits only a band where howling is easily generated in the audio signal SL2 (or SR2) in accordance with characteristics of the headphone of the microphone/speaker integrated type. However, the band-pass filter 61 is not required to have the same characteristics as those of the band-pass filter 51. In the second processing unit 122, the extraction of only the band where howling is easily generated using the band-pass filter 61 can similarly reduce malfunctions of howling reduction caused by erroneous detection of sounds other than howling as howling.

It is preferable that the band-pass filter 51 of the first processing unit 121 and the band-pass filter 61 of the second processing unit 122 are appropriately adjusted in consideration of the characteristics and the manner of reduction of howling.

The envelope wave detection unit 62 performs a peak hold process for an output of the band-pass filter 61 for an appropriate period to generate and output an envelope signal (envelope).

The second shape filter 63 detects an inclination of the envelope during generation of howling sound, and particularly transmits data in a case where howling continuously increases in excess of a fixed threshold (second threshold th2).

The second reduction control signal generation unit 64 generates the instruction signal CL2 (or CR2) which immediately and considerably decreases the gain of the amplifier in a case of continuous reception of an output from the second shape filter 63 for a fixed time.

The L-channel processing unit 122L thus configured monitors the audio signal SL2, and outputs the instruction signal CL2 which instructs a gain decrease for howling reduction during howling generation in the L channel. The instruction signal CL2 is a control signal for an L-channel gain of the amplifier 24.

The R-channel processing unit 122R monitors the audio signal SR2, and outputs the instruction signal CR2 which instructing a gain decrease for howling reduction during howling generation in the R channel. The instruction signal CR2 is a control signal for an R-channel gain of the amplifier 24.

In this manner, the second processing unit 122 also performs a similar howling reduction process independently for each of the L channel and the R channel.

The analysis unit 11 includes an ambient sound analysis filter 71, an envelope wave detection unit 72, a determination unit 73, and a timer unit 74.

The ambient sound analysis filter 71 is a band-pass filter which extracts a predetermined band component from the audio signal SL2 (or SR2). The analysis unit 11 performs a process for switching between a process (first process) performed by the first processing unit 121 and a process (second process) performed by the second processing unit 122 in the characteristic control unit 12 in accordance with an ambient noise level. Accordingly, the ambient sound analysis filter 71 extracts a band appropriate for determination of the noise level.

The envelope wave detection unit 72 performs a peak hold process for an output from the ambient sound analysis filter 71 for an appropriate period to generate and output an envelope signal (envelope).

The determination unit 73 compares an output from the envelope wave detection unit 72 with a predetermined noise determination threshold thC to determine an ambient noise level. Thereafter, the determination unit 73 outputs the switching signal CS in accordance with a determination result.

Particularly in the present embodiment, determination of a noisy environment is made when an envelope level exceeds the noise level threshold thC. In this case, the switching signal CS which switches the process from the first process to the second process is output to the characteristic control unit 12.

The timer unit 74 counts a predetermined time condition. The determination unit 73 also outputs the switching signal CS in accordance with a time count by the timer unit 74. Particularly in the present embodiment, determination of a quiet environment is made when a state of an envelope level equal to or lower than the noise level threshold thC continues for a predetermined time during operation of the second process. In this case, the switching signal CS which switches the process from the second process to the first process is output to the characteristic control unit 12.

3. Howling Reduction Process

The howling reduction process performed by the controller 1 having the foregoing function configuration in FIG. 3 will be described in detail.

A delay time from an input via the microphones 6L and 6R to an output from the speakers 7L and 7R needs to be reduced to achieve more natural reproduction and output of external sounds from the speakers 7L and 7R as described above. Moreover, gains of the filter 23 and the amplifier 24 need to be appropriately adjusted to achieve natural reproduction of external sounds. The system may easily generate howling in a case where the microphones 6R and 6L and the speakers 7L and 7R are covered after completion of the foregoing actions.

Accordingly, the characteristic control unit 12 inputs an external sound to the controller 1 to prevent an increase of howling by decreasing the gain of the amplifier 24 at the time of detection of an audio signal assumed as howling.

However, this method is only a uniform howling reduction method for audio signals input via the microphones 6L and 6R. In this case, malfunctions may increase. Accordingly, malfunctions are reduced by recognizing the ambient noise level using the ambient sound analysis unit, and selecting an appropriate howling reduction method for each noise level.

According to the present embodiment, the howling reduction process performed by the first processing unit 121 (first process) extracts a band where howling is easily generated by using the band-pass filter 51, and decreases the gain in accordance with the instruction signals CL (CL1) and CR (CR1) in a case where the envelope of the band is determined to be howling by the processing of the first shape filter 53 and the reduction control signal generation unit 54. Particularly in the first process, howling is reduced from a stage at a lowest possible level such that the user does not easily sense howling.

In this case, however, a malfunction may be caused by an excessive reaction to a level increase in a noisy environment. Accordingly, in the noisy environment, the first process is switched to the howling reduction process performed by the second processing unit 122 and suited for the noisy environment (second process). The second process distinguishes between a level increase by ambient sounds and a level increase by howling, and reduces howling by considerably decreasing the gain at the time of determination as howling.

Initially, the first process performed by the characteristic control unit 12 will be described with reference to FIGS. 4 and 5.

Figure 4:
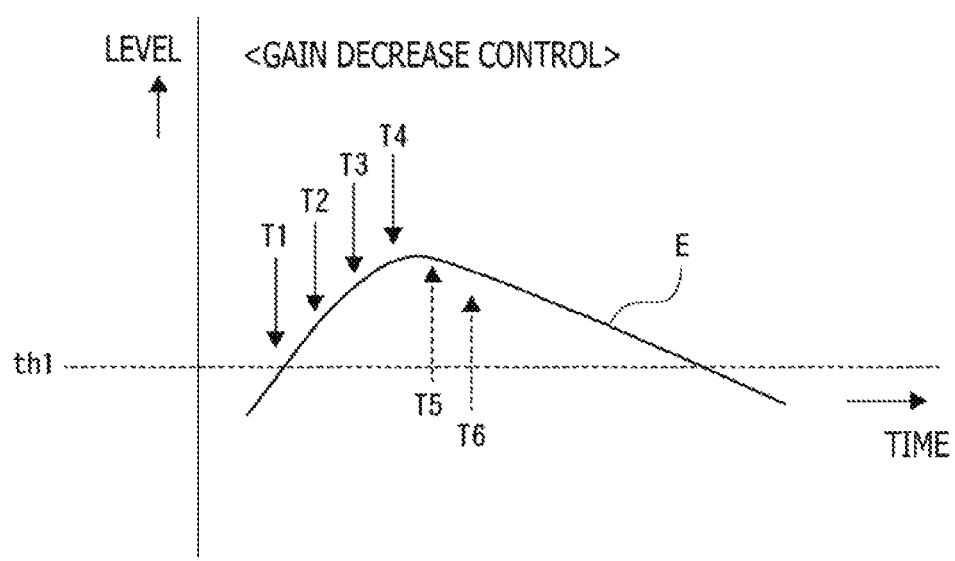
FIG. 4 is an explanatory diagram of a first process performed for howling reduction according to the embodiments.

In FIG. 4, the horizontal axis represents time, while the vertical axis represents an envelope E of the audio signal SL2 (or SR2) output from the envelope wave detection unit 52 as a sound pressure level.

A level indicated by a broken line represents the first threshold th1. The first threshold th1 is set to 67 dBSPL, for example.

In the first process, the instruction signal CL (CL1) or CR (CR1) which instructs a gain decrease by 1 dB for each 1 ms is output to the amplifier 24 in a period in which the envelope E exceeds the first threshold th1.

In this case, the gain decrease instruction is issued in a condition that the current envelope level has increased by 0 to 4 dB from the previous (1 ms before) envelope on the basis of the inclination obtained by the first shape filter.

For example, assuming that each of time points T1, T2, T3, and others in FIG. 4 is timing of 1 ms intervals, for example, the envelope level exceeds the first threshold th1 and is higher than the previous level by 0 to 4 dB at each of the time points T1, T2, T3, and T4. In this case, the instruction signal CL or CR instructing a gain decrease by 1 dB is output to the amplifier 24 at each of these time points. In this manner, howling reduction is rapidly performed at the time of determination of howling generation.

Note that the envelope level at each of the time points T5 and T6 exceeds the first threshold th1, but not in a state of the increase by 0 to 4 dB from the previous level. Accordingly, the instruction of the gain decrease by 1 dB is not issued. This instruction is not issued in consideration that howling reduction has been already started at these time points by the gain decreases previously completed. In this case, a further gain decrease instruction is not issued to avoid an unnatural state of the speaker output sound as a result of an excessive decrease of the gain of the amplifier 24.

Described herein is a process performed by the characteristic control unit 12 in a period of selection of the first process described above. Note that the first process described below is individually and independently for each of the L-channel processing unit 121L and the R-channel processing unit 121R in the present embodiment.

Figure 5:
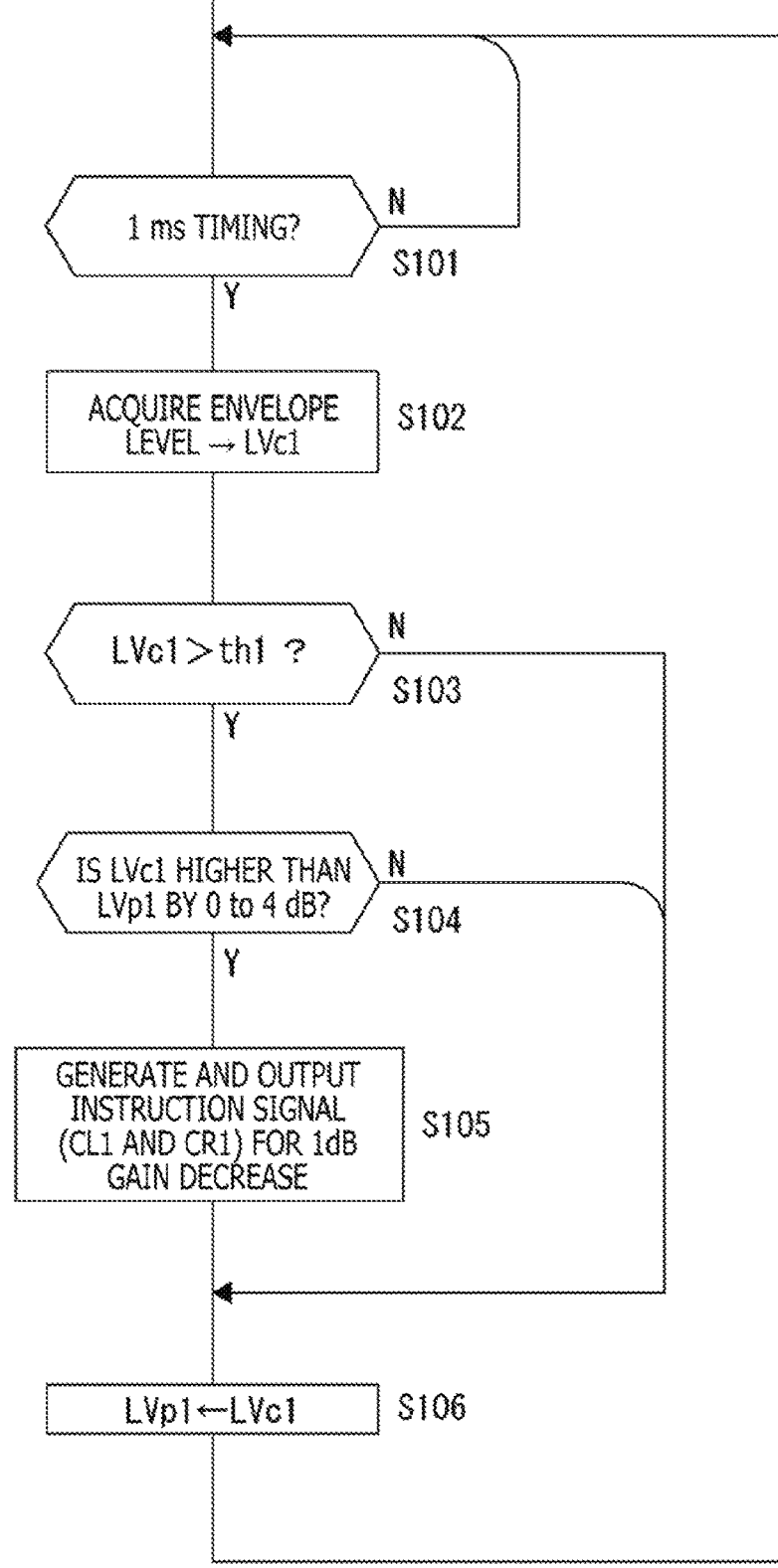
FIG. 5 is a flowchart of instruction signal generation in the first process according to the embodiments.

In the first process, the characteristic control unit 12 executes a process depicted in FIG. 5 by the functions of the first shape filter 53 and the first reduction control signal generation unit 54 after completion of the processing performed by the band-pass filter 51 and the envelope wave detection unit 52 in the manner described above.

In step S101 in FIG. 5, the characteristic control unit 12 checks determination timing at intervals of 1 ms. At the time of the determination timing, the characteristic control unit 12 advances the process from step S101 to S102, checks an envelope level at that time, and retains the envelope level as a current level value LVc1.

In step S103, the characteristic control unit 12 compares the current level value LVc1 with the first threshold th1, and advances the process to step S104 in a case of LVc1>th1, or advances the process to step S106 not in the case of LVc1>th1.

In the case where the process advances to step S104, the characteristic control unit 12 compares the current level value LVc1 with a previous level value LVp1 to check whether or not the current level value LVc1 has become higher than the previous level value LVp1 by 0 to 4 dB. Thereafter, at the time of an increase by 0 to 4 dB, the characteristic control unit 12 advances the process to step S105. When an increase by 0 to 4 dB cannot be confirmed, the process advances to step S106.

In the case where the process advances to step S105 with an increase of the current level value LVc1 from the previous level value LVp1 by 0 to 4 dB, the characteristic control unit 12 generates and outputs an instruction signal (CL1 or CR1) which instructs a gain decrease by 1 dB. As a result, the gain of the amplifier 24 is decreased for howling reduction in the L channel or the R channel.

More specifically, control for the gain decrease by 1 dB is performed in a condition of an excess of the envelope level from the first threshold th1, and an increase of the envelope level by 0 to 4 dB from the previous level.

In a case of determination that LVc1>th1 does not hold in step S103, or in a case where an increase from 0 to 4 dB cannot be confirmed in step S104, processing in step S105 is not performed. Accordingly, the gain decrease instruction is not issued.

In step S106, the characteristic control unit 12 substitutes the current level value LVc1 for the previous level value LVp1 to provide a reference as a previous level next time. Thereafter, the process returns to step S101.

In the period of selection of the first process by the characteristic control unit 12, the processing by the first shape filter 53 and the first reduction control signal generation unit 54 in FIG. 5 as described above is continued together with the processing performed by the band-pass filter 51 and the envelope wave detection unit 52.

Accordingly, the gain decrease control is performed at intervals of 1 ms at the time of determination of howling generation based on the first threshold th1 and the envelope inclination. In this manner, a gain decrease of a sound close to the characteristics of howling can be rapidly achieved. In other words, howling can be rapidly reduced at the time of howling generation.

However, when rapid reduction control is emphasized as described in the first process, noise passing through the processing of the first band-pass filter 51 and the first shape filter 53 is frequently produced in a noisy environment of a place where a lot of people gather, such as a station and a downtown. In this case, an erroneous gain decrease may be easily carried out as a malfunction.

Accordingly, the characteristic control unit 12 is capable of executing the second process as another howling reduction control process.

The second process performed by the characteristic control unit 12 will be described with reference to FIGS. 6, 7, and 8.

Figure 6:
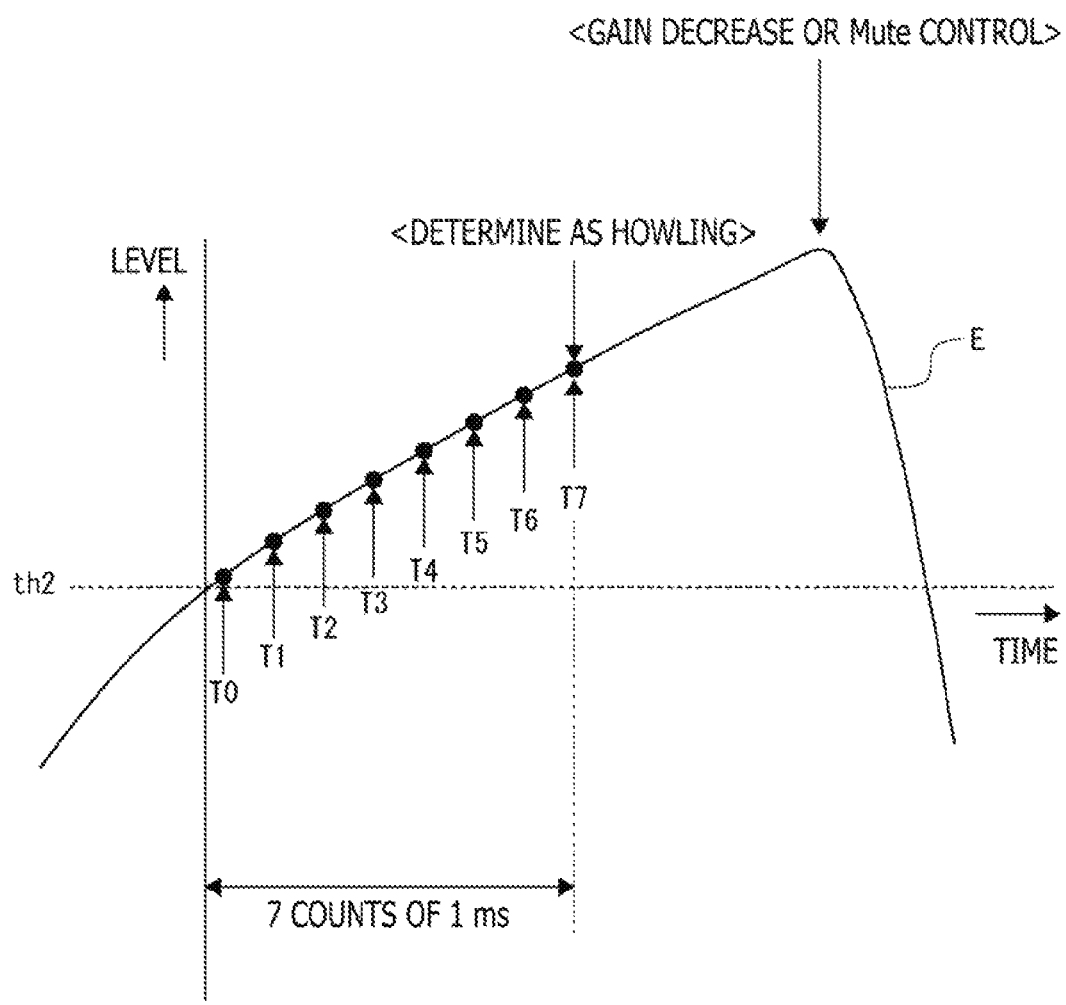
FIG. 6 is an explanatory diagram of a second process for howling reduction according to the embodiments.
Figure 7:
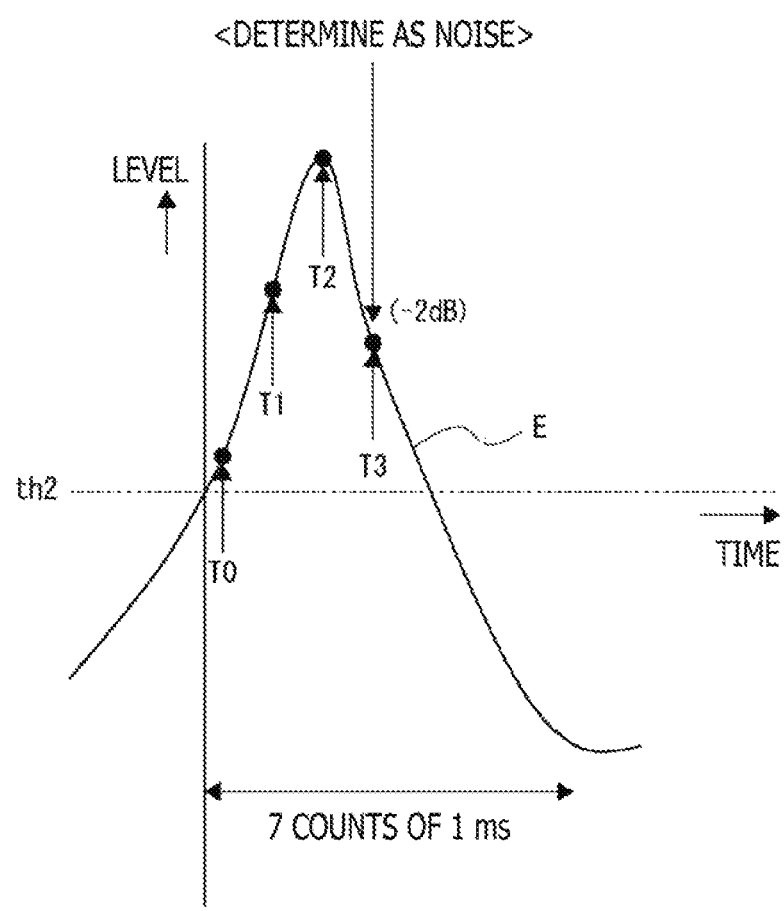
FIG. 7 is an explanatory diagram of the second process performed for howling reduction according to the embodiments.

In FIGS. 6 and 7, the horizontal axis represents time, while the vertical axis represents an envelope E of the audio signal SL2 (or SR2) output from the envelope wave detection unit 62 as a sound pressure level similarly to FIG. 4.

A level indicated by a broken line represents the second threshold th2. It is assumed herein that the second threshold th2 is a level higher than the first threshold th1, such as 72 dBSPL.

In the second process, the count is incremented at timing intervals of 1 ms, for example, when the envelope E exceeds the second threshold th2. In addition, determination of howling is made when a level drop of 2 dB or more is not observed in a period of 7 ms (period of 8 counts), for example, and the instruction signal CL (CL2) or CR (CR2) instructing a considerable gain decrease or a mute is output to the amplifier 24.

For example, the envelope level continuously exceeds the second threshold th2 at time points T0, T1, T2, T3 and up to T7 at intervals of 1 ms in FIG. 6. Accordingly, the count value becomes "8." In this period of 7 ms, a level drop of 2 dB or more is not observed. In such a case, determination of howling generation is made, and the instruction signal CL or CR instructing a considerable gain decrease or a mute is output to the amplifier 24. The considerable gain decrease or the mute of the amplifier is practiced. Accordingly, the envelope level observed at the following time points sharply drops as depicted in the figure. In this manner, howling reduction is achieved.

On the other hand, in a case of an envelope waveform as depicted in FIG. 7, the count is incremented at each of the time points T0, T1, and T2. However, a level drop of 2 dB or more is observed at the time point of T3. In this case, the count value does not reach "8," wherefore determination of howling generation is not made. For example, determination of a temporal level rise produced by noise is made. Accordingly, control for a considerable gain decrease or a mute is not practiced.

Described herein is a process performed by the characteristic control unit 12 in a period of selection of the second process described above. Note that the second process described below is also individually and independently for each of the L-channel processing unit 122L and the R-channel processing unit 122R.

Figure 8:
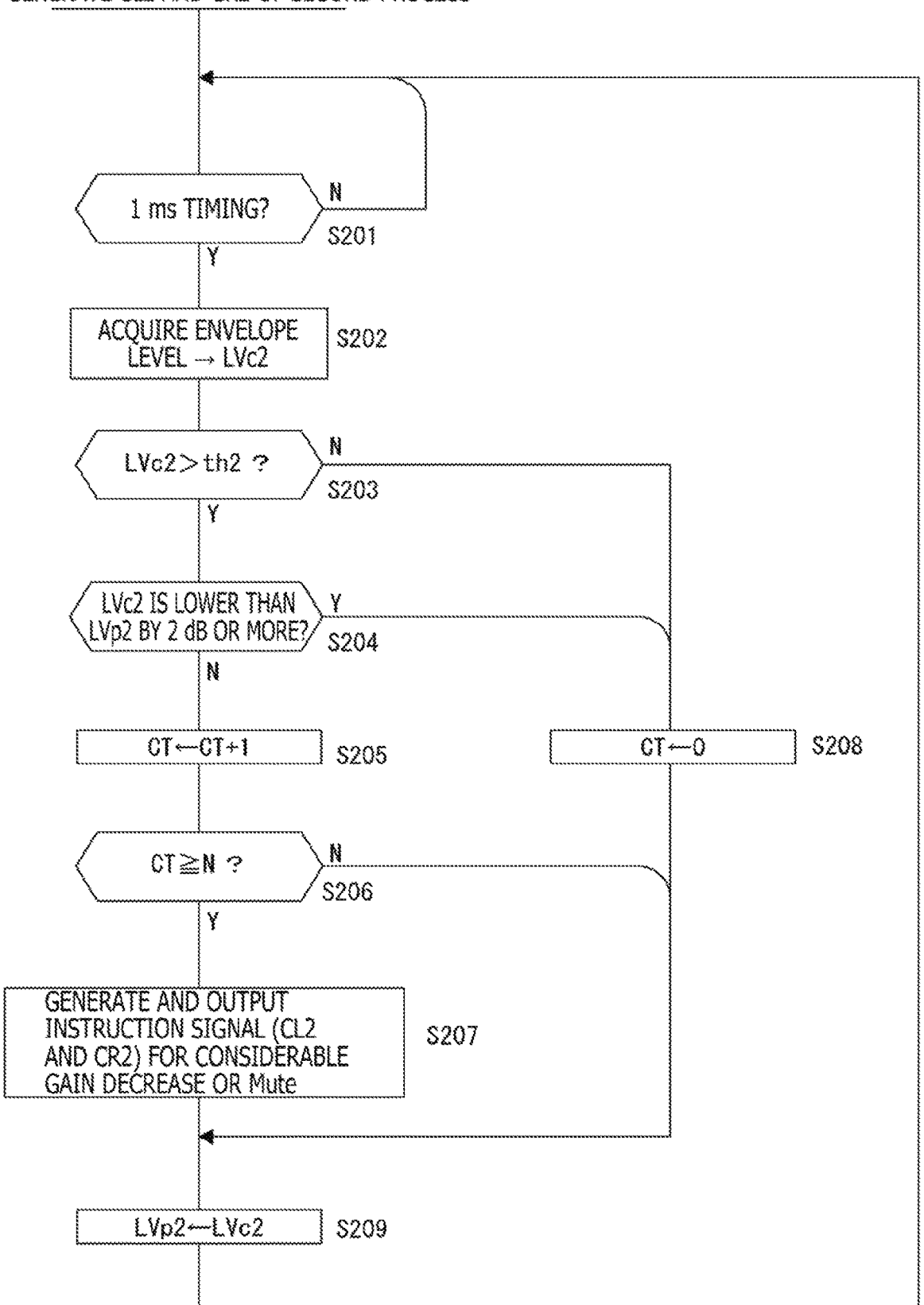
FIG. 8 is a flowchart of instruction signal generation in the second process according to the embodiments.

In the second process, the characteristic control unit 12 performs a process depicted in FIG. 8 by the functions of the second shape filter 63 and the second reduction control signal generation unit 64 after completion of the processing performed by the band-pass filter 61 and the envelope wave detection unit 62 in the manner described above.

In step S201 in FIG. 8, the characteristic control unit 12 checks determination timing at intervals of 1 ms. At the time of the determination timing, the characteristic control unit 12 advances the process from step S201 to step S202, checks an envelope level at that time, and retains the envelope level as a current level value LVc2.

In step S203, the characteristic control unit 12 compares the current level value LVc2 with the second threshold th2, and advances the process to step S204 in a case of LVc2>th2, or advances the process to step S208 not in the case of LVc2>th2.

In the case where the process advances to step S204, the characteristic control unit 12 compares the current level value LVc2 with a previous level value LVp2 to check whether or not the current level value LVc2 has become lower than the previous level value LVp2 by 2 dB or more. Thereafter, in a case where a drop of 2 dB or more is confirmed, the characteristic control unit 12 advances the process to step S208. When a drop by 2 dB or more is not confirmed, the process advances to step S205.

In a case where the process advances to step S205, the characteristic control unit 12 increments a count value CT, and advances the process to step S206. While not depicted in the figure, the count value CT is reset to 0 at the time of a start of the process in FIG. 8.

Meanwhile, in a case where the process advances to step S208, the characteristic control unit 12 resets the count value CT, and advances the process to step S209.

In step S206, the characteristic control unit 12 checks whether or not the count value CT reaches a determination value N. The determination value N is a reference value for howling generation determination, and is set to 8 (count corresponding to the period of 7 ms) in the foregoing example depicted in FIG. 6. Needless to say, the determination value N is not limited to "8," but may be set to any appropriate value.

The characteristic control unit 12 advances the process to step S207 in a case where CT≥N holds. However, the characteristic control unit 12 advances the process to step S209 in a case where CT≥N does not hold.

In the case where the process advances to step S207, the characteristic control unit 12 determines howling generation, and generates and outputs the instruction signal (CL2 or CR2) instructing a considerable gain decrease or a mute. As a result, processing for the considerable gain decrease or the mute of the amplifier 24 is performed for howling reduction in the L channel or the R channel.

More specifically, howling reduction control is performed in a condition that the envelope level exceeds the second threshold th2, and that the state where a drop by 2 dB is not observed continues for a period of N counts (no reset in step S208 until N counts).

In step S209, the characteristic control unit 12 substitutes the current level value LVc2 for the previous level value LVp2 for providing a reference as a previous level next time. Thereafter, the process returns to step S201.

In the period of selection of the second process by the characteristic control unit 12, the processing by the second shape filter 63 and the second reduction control signal generation unit 64 in FIG. 8 as described above is continued together with the processing performed by the band-pass filter 61 and the envelope wave detection unit 62. Howling generation is determined using the second threshold th2 and the count value CT counted in accordance with the envelope inclination (S205) to prevent erroneous determination that instantaneous high level noise is howling. In addition, the second threshold th2 is a level higher than the first threshold th1, wherefore howling reduction is performed only when larger sound energy is input.

In this case, responsiveness to howling generation is slightly lower than that of the first process. However, malfunctions caused by determination of noise as howling decrease.

Moreover, reduction does not start until the count reaches N. In this case, the sound pressure level produced by howling becomes higher than the sound pressure level during execution of the first process. However, the ears of the user are accustomed to large external sounds in a noisy environment, wherefore a relatively large howling sound does not impose a considerable burden on the ears. Otherwise, the user does not easily recognize howling. In other words, the burden on the ears of the user in the second process is similar to the burden in the first process in a noisy environment.

Accordingly, the second process is a howling reduction process suited for a noisy environment.

Note that the second threshold th2 and the fixed time for determination (=determination value N) in the second process are adjusted in consideration of the balance between the magnitude of howling and the malfunction.

In the foregoing example, the gain of the amplifier is rapidly and considerably decreased in a case where the increase equal to or more than the second threshold th2 (72 dBSPL) continues for the period of 7 ms. However, the decrease amount of the gain is considered as a trade-off for the sense of malfunction, and therefore may be the minimum decrease amount required for eliminating howling. This decrease amount is different for each headphone, and therefore is preferably determined in consideration of variations.

For switching between the first process and the second process described above in an appropriate manner, the analysis unit 11 analyzes an ambient noise level, and performs switching control in accordance with a result of the analysis. More specifically, the analysis unit 11 performs processing using the ambient sound analysis filter 71 and the envelope wave detection unit 72, and also performs a switching process depicted in FIG. 9 using the determination unit 73 and the timer unit 74.

Figure 9:
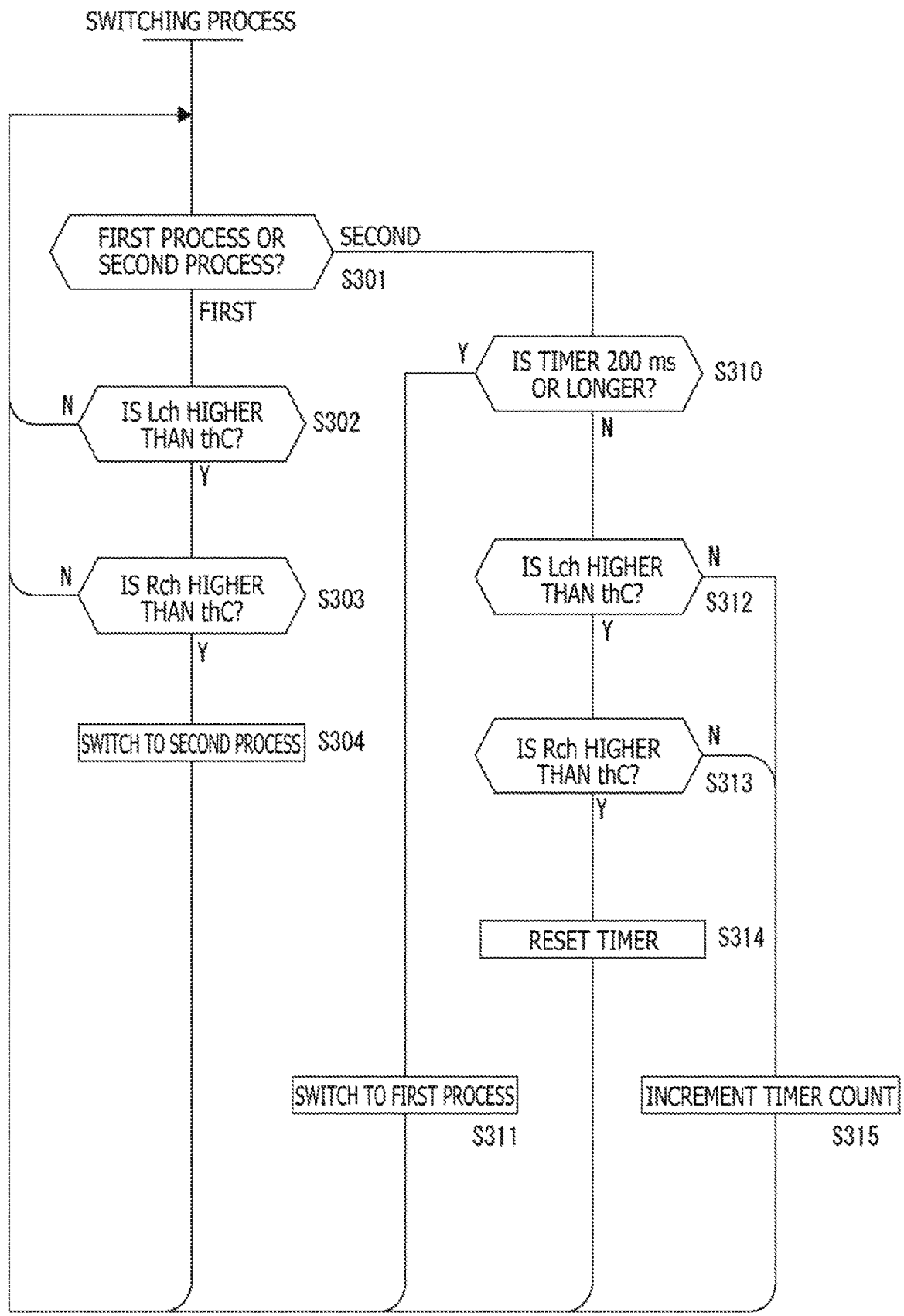
FIG. 9 is a flowchart of a switching process according to the embodiments.

It is assumed that the characteristic control unit 12 is set to a state for performing the first process in an initial state after power-on, and that FIG. 9 depicts a process started in that state by the analysis unit 11.

In step S301, the analysis unit 11 branches the process in accordance with selection of the first process or the second process as the howling reduction process.

The first process is initially selected, wherefore the analysis unit 11 advances the process to step S302. In step S302, the analysis unit 11 determines whether or not an envelope level obtained by the envelope wave detection unit 72 for the audio signal SL2 of the L channel exceeds the noise determination threshold thC. For example, the noise determination threshold thC is set to 60 dBSPL. This value is presented by way of example. It is preferable that the noise determination threshold thC is a level lower than each of the first threshold th1 and the second threshold th2.

When the envelope level of the L channel does not exceed the noise determination threshold thC, the analysis unit 11 determines that the current environment is not a noisy environment, and returns the process to step S301.

When the envelope level of the L channel exceeds the noise determination threshold thC, the process advances to step S303, where the analysis unit 11 determines whether or not the envelope level obtained by the envelope wave detection unit 72 for the audio signal SR2 of the R channel exceeds the noise determination threshold thC. When the envelope level of the R channel does not exceed the noise determination threshold thC, it is determined that the current state is not a noisy environment. In this case, the process returns to step S301.

In other words, at least either the level of the L channel or the R channel does not exceed the noise determination threshold thC, the state of the first process is continued in consideration that the current environment is a relatively quiet environment.

When both the L channel and the R channel exceed the noise determination threshold thC, the analysis unit 11 advances the process to step S304. In this case, the process performed by the characteristic control unit 12 is switched to the second process in accordance with the switching signal CS.

It is assumed that the analysis unit 11 outputs the switching signal CS to the characteristic control unit 12 for convenience of explanation. However, note that the controller 1 is actually an information processing apparatus such as a microcomputer, and the analysis unit 11 and the characteristic control unit 12 are functions implemented by software. Accordingly, the switching signal CS is provided as flag information set for a predetermined register, for example. It is assumed that the first process or the second process is selected with reference to said flag information in the process performed by the characteristic control unit 12.

In the period of selection of the second process, the analysis unit 11 advances the process from step S301 to step S310.

In step S310, the analysis unit 11 checks whether or not the count value of the timer unit 74 is a predetermined time (e.g., 200 ms) or longer.

When the time count of the timer unit 74 does not reach 200 ms, the analysis unit 11 advances the process to step S312, and determines whether or not the envelope level obtained by the envelope wave detection unit 72 for the audio signal SL2 of the L channel exceeds the noise determination threshold thC.

When the envelope level of the L channel does not exceed the noise determination threshold thC, the analysis unit 11 determines a possibility that the current environment is not a noisy environment, and increments the count value of the timer unit 74 in step S315.

In addition, when the envelope level of the L channel exceeds the noise determination threshold thC, the process advances to step S313, where the analysis unit 11 determines whether or not the envelope level obtained by the envelope wave detection unit 72 for the audio signal SR2 of the R channel exceeds the noise determination threshold thC. When the envelope level of the R channel does not exceeds the noise determination threshold thC, there is a possibility that the current environment is not a noisy environment. Accordingly, the count value of the timer unit 74 is incremented in step S315.

In other words, at least either the L channel or the R channel does not exceed the noise determination threshold thC, there is a possibility that the environment has returned to a relatively quiet environment. Accordingly, the count of the timer unit 74 is incremented.

On the other hand, when both the L channel and the R channel exceed the noise determination threshold thC, the analysis unit 11 resets the count of the timer unit 74 in step S314.

Note that the timer unit 74 in FIG. 3 represents a software timer, and indicates a count value counted in the process in FIG. 9 in a case where the process in FIG. 9 is applied. For example, when the process from step S301 in FIG. 9 is performed at intervals of 1 ms, the count value is incremented by one every time the process advances to step S315.

The count control is performed by the timer unit 74 in the manner described above. Accordingly, an elapse of 200 ms in the timer unit 74 in step S310 corresponds to continuation of a state of no noise at 60 dBSPL or larger (relatively quiet state) for 200 ms during execution of the second process. In this case, the analysis unit 11 advances the process to step S311, and switches the process performed by the characteristic control unit 12 to the first process in accordance with the switching signal CS (sets flag information for selecting the first process).

Howling reduction is initially executed in the first process by the foregoing process performed by the analysis unit 11.

In a quiet environment, howling reduction is executed in the first process. When a sound having passed through the band-pass filter 51, the envelope wave detection unit 52, and the first shape filter 53 exceeds 67 dBSPL (first threshold th1), the gain is rapidly and continuously decreased little by little during the excess of this level.

At this time, howling is reduced to approximately 67 dBSPL when howling is actually generated. However, in a case of a rise of the envelope level produced by noise, incongruity is sensed with a change of the gain of the external sound.

Accordingly, in a case where a sound having passed through the ambient sound analysis filter 71 of both the L channel and the R channel exceeds 60 dBSPL, the analysis unit 11 determines this sound as noise, and immediately switches the process to the second process.

The first threshold th1 of the first process is 67 dBSPL, while the noise determination threshold thC is 60 dBSPL. Accordingly, the process can be switched to the second process before the howling reduction function of the first process starts.

Note that the analysis unit 11 is therefore capable of determining a noise level only in the band of the malfunction in the first process when the ambient sound analysis filter 71 of the analysis unit 11 has passband characteristics similar to (or identical to) those of the band-pass filter 51. In this case, the necessity of useless switching to the second process is eliminated.

Malfunctions caused by the first process in a noisy environment are reduced by switching to the second process. The excess of 60 dBSPL in both the L channel and the R channel is established as the condition for determination because the excess in only either of the channels is insufficient for determination.

In this case, note that the process switches to the second process in response to noise detection even in a quiet environment in a case where howling is intentionally generated by covering both the ears with hands. As a result, the burden imposed on the ears may increase. For overcoming this problem, such a howling characteristic that a sound increases at a particular frequency is utilized. On the basis of this characteristic, it is also considered that determination of howling is made in a case where both the L channel and the R channel have this characteristic. In this case, the process is immediately returned to the first process to reduce howling with a small sound.

After switching to the second process in the noisy environment, whether or not the current environment is returned to a quiet environment is determined on the basis of the count value of the timer unit 74. When determination that the current environment has returned to a quiet environment, the process is returned to the first process. In a noisy environment, malfunctions are reduced by the second process. However, in a quiet environment, the process is switched to the first process which reduces howling with excellent responsiveness.

A predetermined time length required for returning the process from the second process to the first process (elapsed time of the timer unit 74 after the end of noise) is determined on the basis of a balance between the required time and tuning of the first process.

In addition, the period and frequency of the state switched to the second process increase as the noise level rises. However, howling becomes less remarkable in accordance with the rise of the noise level, wherefore the burden on the ears caused by howling decreases.

On the contrary, in a case of a small noise, the period and frequency of the state switched to the second process decrease. Accordingly, the burden on the ears can be reduced in view of probability.

As described above, howling is reduced to a small sound using the first process in a quiet environment. In a noisy environment, however, the relative levels of howling and noise, and the period and frequency of the state switched to the second process are changed in accordance with the noise level using the noise detection and the second process. In this manner, the burden on the ears caused by howling can be well controlled.

4. Controller Configuration of Second Embodiment

A configuration example of the controller 1 according to a second embodiment will be described with reference to FIG. 10. Note that parts identical to the corresponding parts in FIG. 3 are given identical reference numbers, and repeated description is avoided.

Figure 10:
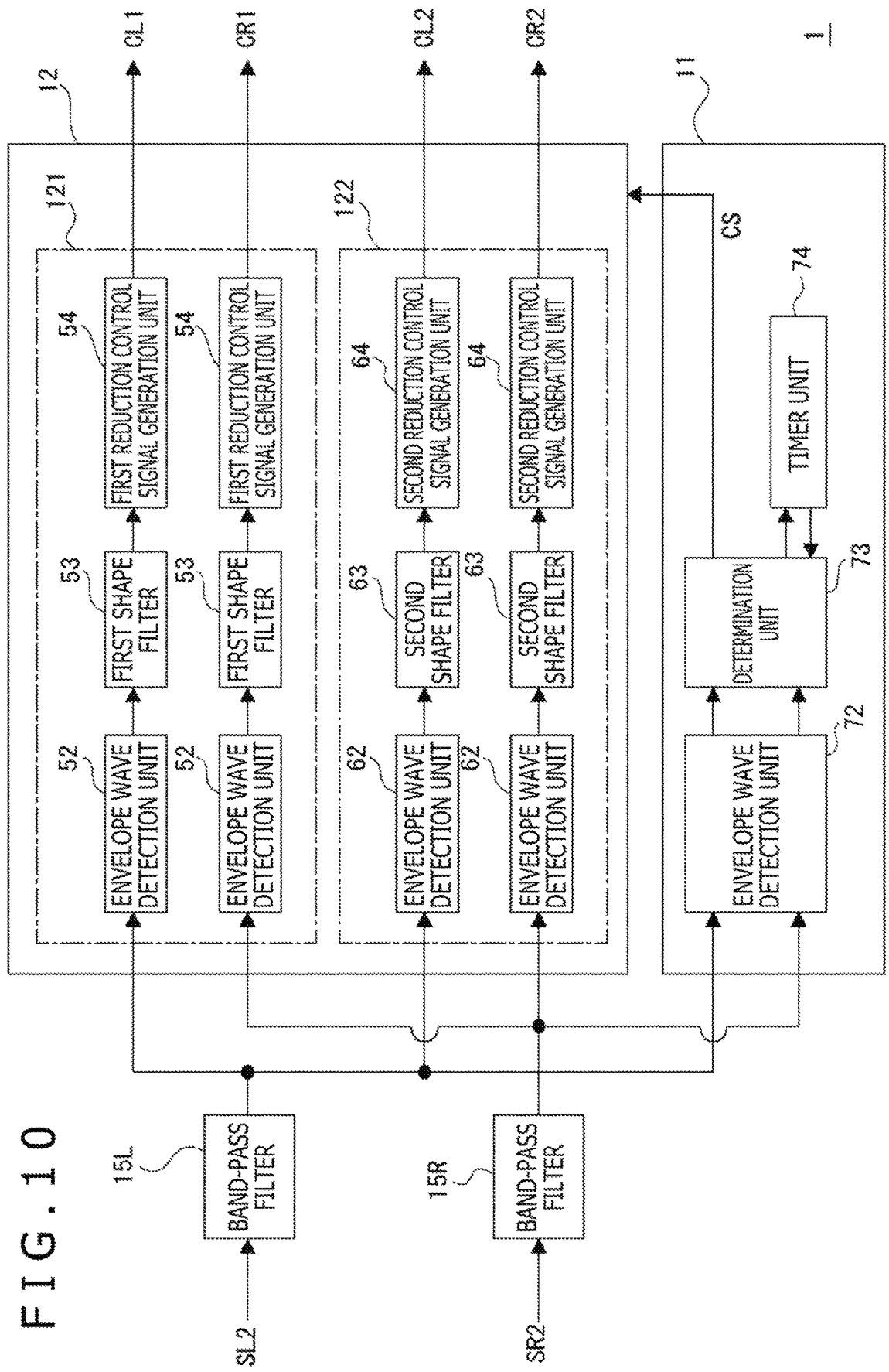
FIG. 10 is a block diagram depicting processing functions of a controller according to a second embodiment.

The configuration example in FIG. 10 includes the first processing unit 121, the second processing unit 122, and band-pass filters 15L and 15R used as common components by the analysis unit 11.

The band-pass filters 15L and 15R function as the band-pass filters 51 and 61 and the ambient sound analysis filter 71 depicted in FIG. 3 for the audio signals SL2 and SR2 of the L channel and the R channel, respectively.

More specifically, an output from the band-pass filter 15L is supplied to the envelope wave detection units 52, 62, and 72 of the L channel, while an output from the band-pass filter 15R is supplied to the envelope wave detection units 52, 62, and 72 of the R channel.

As described above, the band-pass filters 51 and 61 and the ambient sound analysis filter 71 in the configuration in FIG. 3 may be constituted by band-pass filters having the same passband. Accordingly, the configuration (processing load) can be simplified by using the band-pass filters 15L and 15R in FIG. 10 as common components.

Note that the configuration in FIG. 3 is less advantageous than the configuration in FIG. 10 in the point of complexity of the configuration (heavy processing load), but is advantageous in that more precise control is achievable by individually tuning the band-pass filters 51 and 61 and the ambient sound analysis filter 71.

5. Application Examples of Headphone and Audio Player

Application examples of the controller 1 described above will be described with reference to FIGS. 11A, 11B, and 12.

Figure 11A:
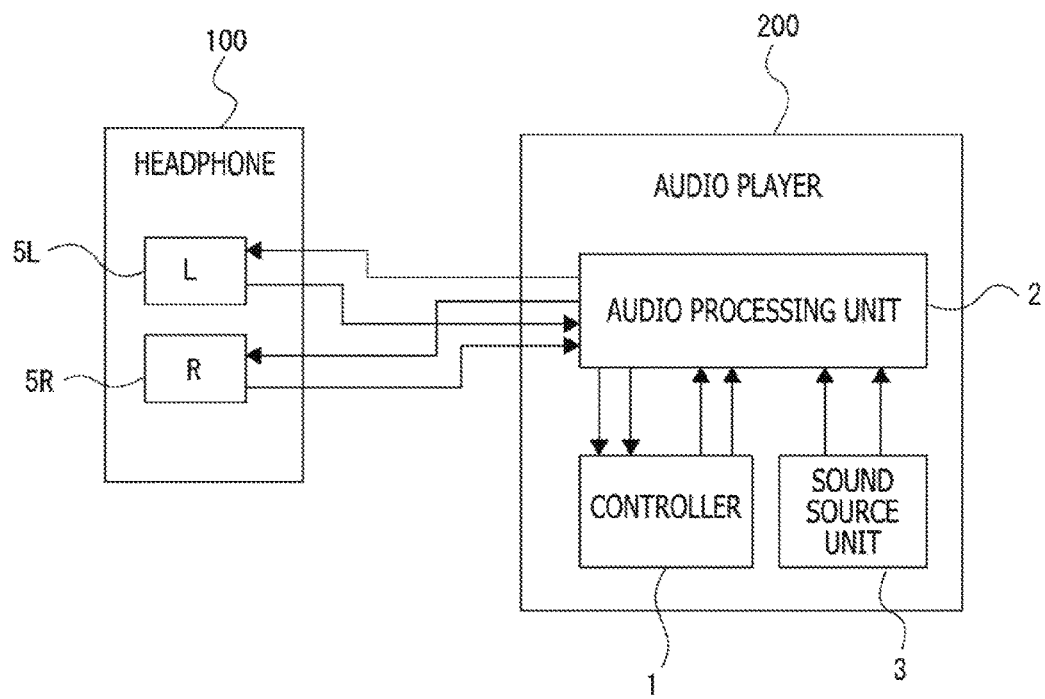
FIGS. 11A and 11B are explanatory diagrams of application examples of the headphone and the audio player.

FIG. 11A depicts an example corresponding to the headphone 100 and the audio player 200 described above with reference to FIG. 1. In this case, the controller 1 is included in the audio player 200.

Figure 11B:
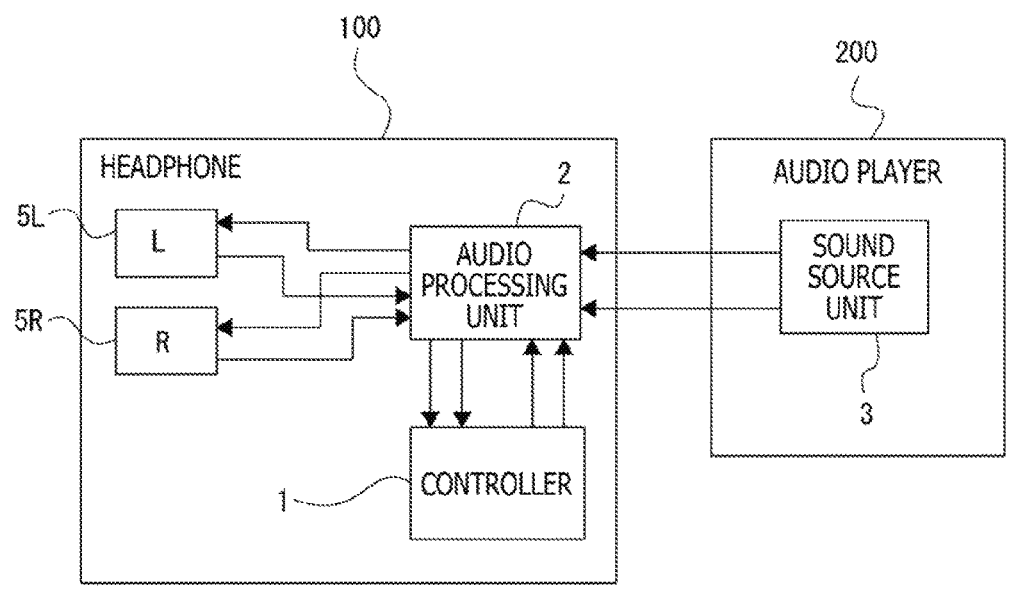

However, a configuration depicted in FIG. 11B may be considered.

In this case, the audio processing unit 2 and the controller 1 as well as the L unit 5L and the R unit 5R are included in the headphone 100, while the sound source unit 3 is included in the audio player 200. Audio signals (audio signals SL4 and SR4 in FIG. 1), such as music, are transmitted from the audio player 200 to the audio processing unit 2 of the headphone 100 by wired or wireless transmission. The audio processing unit 2 of the headphone 100 performs processing necessary for audio signals received via not-depicted microphones included in the L unit 5L and the R unit 5R, and adds the audio signals (audio signals SL3 and SR3 in FIG. 1) to audio signals from the audio player. In addition, after completion of the necessary processing, sounds are output from not-depicted speakers included in the L unit 5L and the R unit 5R. In the case of this configuration, the controller 1 also performs the functions of the analysis unit 11 and the characteristic control unit 12 similarly to the case depicted in FIG. 1.

The controller 1 may be built in either the headphone 100 or the audio player 200 as depicted in FIGS. 11A and 11B.

In addition, while not depicted in the figure, the controller 1 may be a device separated from the headphone 100 and the audio player 200.

Figure 12:
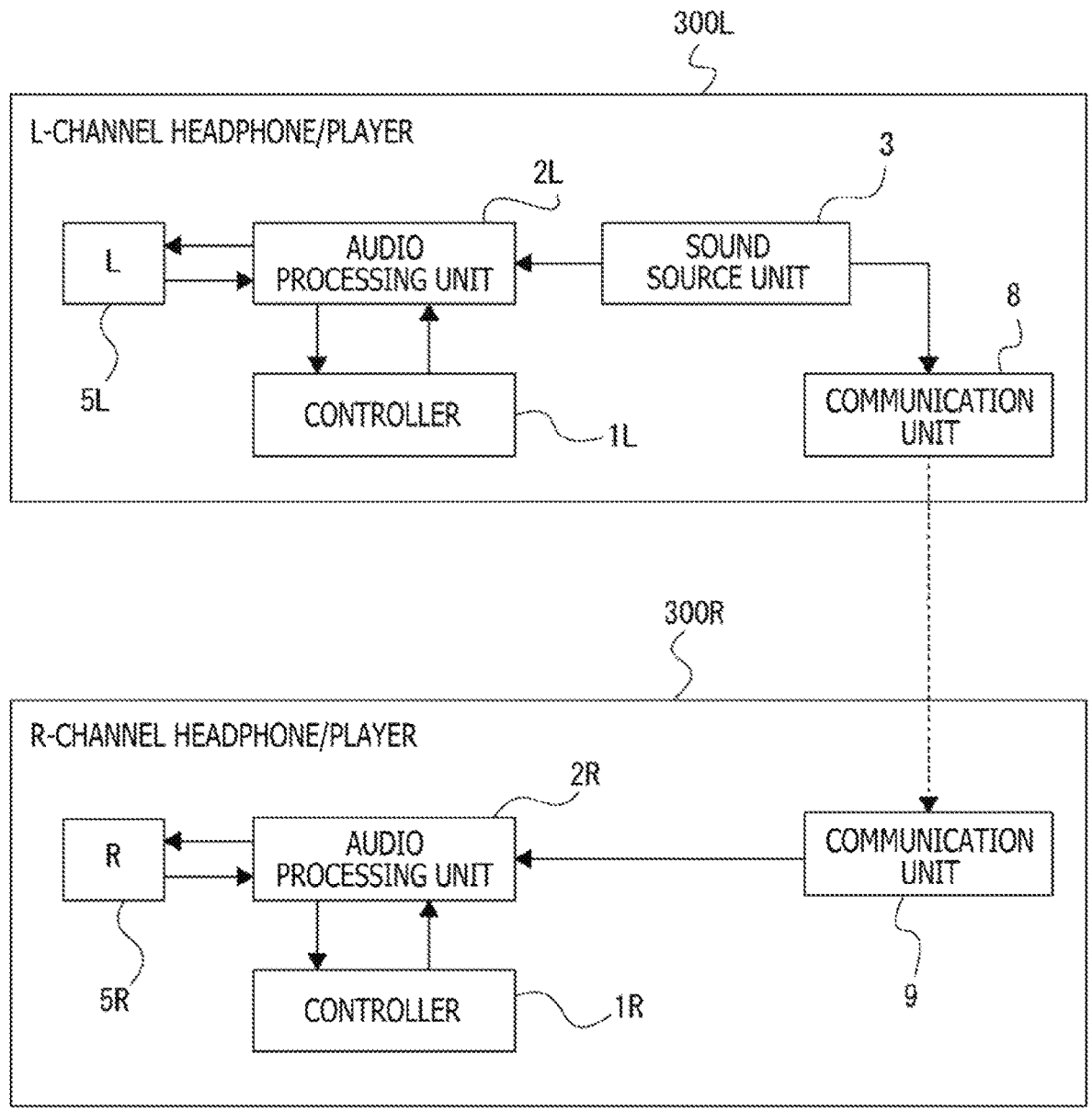
FIG. 12 is an explanatory diagram of an application example of the headphone and the audio player.

FIG. 12 depicts an audio reproduction system which includes a headphone and a player integrated with each other.

An L-channel headphone/player 300L and an R-channel headphone/player 300R are components separated from each other.

The L-channel headphone/player 300L includes an L unit 5L, an audio processing unit 2L for the L channel, a controller 1L for the L channel, the sound source unit 3, and a communication unit 8.

The R-channel headphone/player 300R includes an R unit 5R, an audio processing unit 2R for the R channel, a controller 1R for the R channel, and a communication unit 9.

In this case, an audio signal of the L channel included in audio signals of music content or the like generated from the sound source unit 3 is supplied to the audio processing unit 2L. An audio signal of the R channel is supplied to the audio processing unit 2R via communication between the communication units 8 and 9. The communication units 8 and 9 achieves transmission of audio signals via near field communication, for example.

The controller 1L receives an input of ambient sounds concentrated by a microphone of the L unit 5L, and performs the processing described above using the analysis unit 11 and the characteristic control unit 12.

The controller 1R receives an input of ambient sounds concentrated by a microphone of the R unit 5R, and performs the processing described above using the analysis unit 11 and the characteristic control unit 12.

Accordingly, even in the case of the device which includes the controller 1 of the present technology on each of the L-channel headphone/player 300L and the R-channel headphone/player 300R separated from each other, howling reduction can be achieved using a control method selected in accordance with an external environment by providing the controller 1 of the present technology on each of the L-channel headphone/player 300L and the R-channel headphone/player 300R.

6. Summary and Modified Examples

According to the embodiments described above, following advantageous effects are produced.

The controller 1 according to the embodiments includes: the characteristic control unit 12 capable of selectively executing a plurality of control methods as an audio signal characteristic control method for the audio processing unit 2 provided for receiving an input of a sound via the microphones 6L and 6R and outputting the sound from the speakers 7L and 7R; and the analysis unit 11 that analyzes the sound input via the microphones 6L and 6R, and selects a control method executed by the characteristic control unit 12 for the audio processing unit 2 on the basis of an analysis result.

In other words, the controller 1 is capable of selectively executing a plurality of control methods (audio signal characteristic control algorithms for particular purposes, such as the first process and the second process described above) as control for changing audio signal characteristics, and selects a control method to be executed on the basis of analysis of ambient sounds. In this case, not the audio signal characteristics are simply switched, but a manner of a change of the audio signal characteristics is switched in accordance with an ambient audio situation. Accordingly, the manner of the change of the audio signal characteristics can be selected in accordance with the ambient audio situation input via the microphones, wherefore a speaker output corresponding to the ambient audio situation is achievable.

In the embodiments, the example which switches between the first process and the second process corresponding to the manner of the change of the audio signal characteristics for howling reduction has been described. However, note that various control examples are considered other than the control of the audio signal characteristics for purposes other than howling reduction.

For example, a plurality of executable algorithms for variable control of the passband of the filter 23 may be provided to implement a speaker output appropriate or comfortable for the user and selected in accordance with an ambient sound analysis result.

In addition, a plurality of executable algorithms for varying boost and attenuation bands and levels of audio signals may be provided and selected in accordance with an ambient sound analysis result.

Furthermore, a plurality of executable algorithms for varying audio signal characteristics as foreign sounds for noise cancelling may be provided and selected in accordance with an ambient sound analysis result.

According to the example described in the embodiments, the controller 1 (characteristic control unit 12) is capable of selectively executing a plurality of audio signal characteristic control methods (first process and second process) for howling reduction.

In this case, the control method for appropriate howling reduction can be selected in accordance with the ambient sound situation input via the microphones, thereby achieving a speaker output while executing an appropriate howling prevention process in accordance with the ambient sound situation.

Particularly, the method for howling reduction is switched in accordance with ambient sound characteristics, wherefore higher quality howling reduction is achievable in correspondence with the magnitude of howling and malfunctions.

In addition, in a system developed for more natural reproduction of external sounds using the headphone 100, unfavorable situations for howling, such as reduction of a delay time, adjustment of an auditory filter, and reduction of the distances between the microphones 6L and 6R and the speakers 7L and 7R, are produced. The technology of the embodiments can achieve a solution at a practical level in these unfavorable situations, wherefore more natural reproduction of external sounds is achievable.

Note that the control methods are not limited to the two control methods as in the embodiments, but may be three or more switchable control algorithms such as a first process, a second process, and a third process to select the control method more precisely in accordance with ambient sounds.

In addition, described has been the example which performs gain control of the amplifier 24 as the audio signal characteristic control for howling reduction. However, other types of control are considered for eliminating howling.

For example, outputting the instruction signals CL and CR not allowing transmission of the howling band is considered as an instruction for varying the passband through the filter 23. Also considered is providing a configuration performing an amplifying process for each band, and outputting the instruction signals CL and CR for instructing attenuation control for only the howling band.

Furthermore, howling may be reduced by producing a delay of audio signals at the audio processing unit 2.

The controller 1 (characteristic control unit 12) according to the embodiments is capable of executing the first process and the second process as the audio signal characteristic control methods for howling reduction. The first process executes signal characteristic control for howling reduction in a condition where a detection level of the audio signal input via the microphones 6L and 6R exceeds the first threshold th1. The second process executes the signal characteristic control for howling reduction in a condition where a detection level of the audio signal input via the microphones 6L and 6R exceeds the second threshold th2 higher than the first threshold th1.

There is a high possibility that an environmental sound is generated and erroneously detected as howling in an especially noisy environment. Accordingly, the second threshold th2 is set higher than the first threshold th1 to establish a stricter howling generation determination and reduce erroneous howling reduction as a malfunction. More specifically, the first process is suited for a howling reduction process exercised in a relatively quiet case where the ambient noise level is relatively low, while the second process is suited for a howling reduction process exercised in a case where the ambient noise level is relatively high.

The first process according to the embodiments is a process that outputs an instruction for howling reduction to the audio processing unit 2 when the detection level exceeds the first threshold th1 and is determined to have an increasing tendency (S103, S104, and S105 in FIG. 5).

More specifically, the first process issues a howling reduction instruction such as a gain decrease by a predetermined amount when the howling level is increasing in a case of determination of howling generation in excess of the first threshold th1.

Control such as an excessive gain decrease can be avoided by issuing a howling reduction instruction in a period of an audio signal level increase (e.g., period of an increase by a predetermined dB or more from 1 ms before). In other words, excessive reduction control is not performed when the sound level drops (while howling reduction is operating). In this manner, natural auditory sensation of the speaker output sound can be maintained.

Note that determination of the increasing tendency is made in a case of an increase ranging from 0 to 4 dB for convenience of explanation of the embodiments. However, this range is presented by way of example. Determination of the increasing state may be made as long as a considerable level drop is not produced. For example, determination that the increasing state is maintained may be made as long as the level does not considerably drop from 2 dB. Alternatively, determination that the increasing tendency is absent may be made in a case of no increase (in a case where the difference from the previous value is 0 dB).

The second process according to the embodiments is a process that outputs an instruction for howling reduction to the audio processing unit 2 in a case where the detection level exceeds the second threshold th2 without detection of a level drop more than a predetermined level range for a predetermined period (S203 to S207 in FIG. 8).

More specifically, in the second process, it is determined whether the sound level increase corresponds to a temporary high level or a continuous level increase caused by howling in a case where the input sound level exceeds the second threshold th2 in a noisy environment. In a case of a possibility of howling, a howling reduction instruction is issued.

In a noisy environment, a high level input which may be erroneously detected as howling is easily given. However, the high level sound to be generated is a single sound, and does not continuously produce a level increase like howling in many cases. Accordingly, for distinguishing between a high level input as sound and howling, the howling reduction instruction is issued to avoid a malfunction of howling reduction based on noise in a case where the sound level exceeds the second threshold th2 in a level increasing state (no detection of level drop) continuing for a certain period.

Note that the user may hear a higher level howling sound produced during the second process than a howling sound during execution of the first process when determination of howling is made on the basis of a high level continuation in a predetermined period (e.g., period of 7 counts) in the second process in a case of the second threshold th2 higher than the first threshold th1. In other words, from a viewpoint of only the howling level, howling is easily sensed. However, the second process is performed in a noisy environment, wherefore the user is relatively accustomed to large sounds. In this case, the burden imposed on the ears by howling is similar to that in the case of the first process, or unlikeliness of sensing howling is similar to that in the case of the first process. Accordingly, the high setting of the second threshold, and the condition of high-level continuation for the predetermined period do not cause problems, but produce, to the contrary, appropriate malfunction prevention effects.

Note that determination of temporary noise and no howling is made when a level drop of 2 dB or more is produced for convenience of explanation of the present embodiments. However, this manner of determination is presented by way of example. Various degrees of the level drop are considered for determining noise.

The first process according to the embodiments compares a signal level of a first band component included in the audio signal input via the microphones 6L and 6R and extracted by the band-pass filter 51 with the first threshold th1, and the second process compares a signal level of a second band component included in the audio signal input via the microphones 6L and 6R and extracted by the band-pass filter 61 with the second threshold th2. More specifically, the signal levels of the particular bands where howling is easily generated (first band and second band) are extracted using the band-pass filters 51 and 61, and handled as targets compared with the first threshold th1 or the second threshold th2. In this manner, precise determination of howling generation can be made on the basis of a result of comparison with the first threshold th1 or the second threshold th2, and an accurate instruction for howling reduction can be output to the audio processing unit 2.

Note that the first band and the second band (i.e., passbands of the band-pass filters 51 and 61) may be the same band. In this case, the band-pass filter process for the first process and the band-pass filter process for the second process can be unified into a common process as described in the second embodiment (FIG. 10). This configuration is suited for a case demanding simplification of the configuration.

According to the example described in the embodiments, the first process compares an envelope level of a first band component included in the audio signal input via the microphones 6L and 6R with the first threshold th1, and the second process compares an envelope signal level of a second band component included in the audio signal input via the microphones 6L and 6R with the second threshold th2.

More specifically, signals in the particular bands where howling is easily generated are extracted by the processing using the band-pass filters 51 and 61 and the envelope wave detection unit 52 and 62. Thereafter, envelope wave detection is performed, and the envelope level thus obtained is compared with the first threshold th1 or the second threshold th2.

In this manner, accurate level determination of the band where howling is easily generated can be made on the basis of a result of comparison with the first threshold or the second threshold. Accordingly, accuracy of howling generation determination improves, wherefore an accurate instruction for howling reduction can be output to the audio processing system.

According to the example described in the embodiments, the controller 1 (analysis unit 11) uses, for a selection process of selecting the control method performed by the characteristic control unit, a result of a comparison between an audio signal level input via the microphones 6L and 6R and the noise determination threshold thC (see FIG. 9).

This example is capable of selecting a control method suited for a state with relatively small ambient sounds or for a noisy state, for example, and appropriately switching the control method performed by the characteristic control unit 12.

More specifically, the first process of the embodiments is a process which reduces howling in a relatively quiet environment from a stage at a lowest possible level. Accordingly, the user senses substantially no howling. In addition, the second process is a process which reduces a malfunction of howling reduction caused by ambient noise in a noisy environment, and rapidly reduces howling at the time of howling generation. Accordingly, when determination of a noisy environment is made by a comparison between the audio signal level and the noise determination threshold, the method is switched to the second method to achieve howling reduction corresponding to the ambient noise and reduce malfunctions. On the other hand, the method is switched to the first method in response to detection of absence of the noisy environment to reduce howling with excellent responsiveness, and achieve such processing capable of outputting ambient sounds containing no unnatural sounds.

According to the example described in the embodiments, the controller 1 (analysis unit 11) uses, for a selection process of selecting the control method performed by the characteristic control unit, a result of a comparison between a signal level of a predetermined band component included in an audio signal input via the microphones 6L and 6R and the noise determination threshold thC (see S302, S303, S312, and S313 in FIG. 9). More specifically, the howling band component of the audio signal input via the ambient sound analysis filter 71 is extracted, and the signal level of the component is compared with the noise determination threshold thC.

In this manner, the noise level can be determined in the band where howling is generated, i.e., the band where erroneous determination of howling is likely to be made. Accordingly, accurate selection of the howling reduction control method is achievable.

For example, even when the noise level is high in bands other than the howling band, the characteristic control unit 12 does not easily perform erroneous howling reduction as a malfunction according to the embodiments. In such a case, it is considered that switching from the first process to the second process is unnecessary. The analysis unit 11 selects the control method for the target of the howling band, wherefore useless switching to the second process is avoided.

According to the example described in the embodiments, the controller 1 (analysis unit 11) uses, for a selection process of selecting the control method performed by the characteristic control unit 12, a result of a comparison between an envelope signal level of a predetermined band component included in an audio signal input via the microphones 6L and 6R and the noise determination threshold thC (see S302, S303, S312, and S313 in FIG. 9). More specifically, the envelope level is compared with the noise determination threshold thC after completion of the processing performed by the ambient sound analysis filter 71 and the envelope wave detection unit 72.

In this manner, the ambient sound level is accurately determined in the band where howling is easily generated. Accordingly, for example, selection accuracy of a plurality of control methods such as the first process and the second process improves, wherefore accurate howling reduction is achievable in accordance with the ambient environment.

According to the example described in the embodiments, the controller 1 (analysis unit 11) uses, for a selection process of selecting the first process and the second process performed by the characteristic control unit, a result of a comparison between an audio signal level input via the microphones 6L and 6R and the noise determination threshold thC lower than the first threshold th1.

More specifically, a relationship "the noise determination threshold thC<the first threshold th1<the second threshold th2" is established.

In this manner, the process can be switched to the second process in a stage before execution of the signal characteristics control for howling reduction in the first process.

According to the example described in the embodiments, the controller 1 (analysis unit 11) uses, for determination of switching from the first process to the second process performed by the characteristic control unit 12, a result of a comparison between a signal level of a first band component (band component extracted by the first process) included in an audio signal input via the microphones 6L and 6R and the noise determination threshold.

More specifically, the signal passband of the ambient sound analysis filter 71 of the analysis unit 11 is equalized with the signal passband of the band-pass filter 51.

In this manner, the ambient situation (whether or not the current environment is a noisy environment) can be determined only in the band where a malfunction of howling reduction is highly likely to be caused by noise in the first process. Accordingly, the process can be appropriately switched to the second process when a malfunction is likely to be caused in the first process, wherefore howling reduction operation accuracy improves.

According to the example described in the embodiments, audio signals generated in a plurality of the channels (L channel and R channel) and obtained via a plurality of the microphones 6L and 6R are input to the controller 1 (analysis unit 11). The analysis unit 11 issues an instruction for switching the control method of the characteristic control unit 12 in a case where all of audio signal levels of the respective channels exceed the noise determination threshold thC (S302 and S303 in FIG. 9).

When all the channels (L channel and R channel) exceed the noise determination threshold thC, there is a high possibility that not howling but a high level ambient sound component is generated. In other words, whether or not the current environment is a noisy environment can be more accurately determined on the basis of determination for all the channels.

According to the example in FIG. 9, the process is switched to the second process in response to the state that the levels of both the L channel and the R channel have exceeded the noise determination threshold thC. In this case, appropriate determination of a noisy environment is made, and the second process capable of reducing malfunctions in a noisy environment is executed.

In addition, according to the example described above, the controller 1 (analysis unit 11) issues an instruction for switching the control method of the characteristic control unit 12 in a case where all of audio signal levels of the respective channels become equal to or lower than the noise determination threshold thC for a predetermined time or longer (S312 and S313 in FIG. 9).

Determination accuracy for determining that howling is not generated from any channel and that a noisy environment has ended improves by making a determination in the condition that all the channels (L channel and R channel) are continuously in a level equal to or lower than the noise determination threshold thC for the predetermined period. In this manner, the process can be appropriately returned to the first process.

According to the example in FIG. 9, the process is switched to the first process in response to the state that the levels of both the L channel and the R channel continuously become the noise determination threshold thC or lower for 200 ms or longer. In this case, appropriate determination of a quiet environment is made, and the first process suited for the quiet environment is executed. Note that the continuation for 200 ms is presented only by way of example. Determination may be made in accordance with other time lengths.

Following modified examples may be considered for the technology according to the present disclosure.

The control method may be switched on the basis of analysis results obtained by the ambient sound analysis of the analysis unit 11 other than the noise level. For example, the control method may be switched in accordance with determination of whether or not the current situation is a noisy situation on the basis of analysis of frequency characteristics of ambient sounds.

The functional configurations in FIGS. 3 and 10 are presented by way of example. For example, an example in which the envelope wave detection units 52, 62, and 72 are not included may be considered.

In addition, a filter transmitting a wide audible passband may be provided without particularly providing the band-pass filters 51 and 61 and the ambient sound analysis filter 71 transmitting the howling band.

Each of the band-pass filters 51 and 61 and the ambient sound analysis filter 71 may be not a band-pass filter but a low-pass filter or a high-pass filter in accordance with purposes.

In addition, in a case where the volume of external sounds heard by the user is increased or decreased by controlling the gain of an ambient sound acquisition path (e.g., gain of the amplifier 24) of the audio processing unit 2, the howling reduction method or parameters of the ambient sound analysis may be controlled, or the howling reduction method or the method of the ambient sound analysis may be switched.

For example, howling is more likely to be generated as the gain given to audio signals increases. Accordingly, it is preferable to change parameters, or switch the reduction method and the analysis method in consideration of this point.

According to the first process of the embodiments, howling reduction is performed individually and independently for each of the L-channel processing unit 121L and the R-channel processing unit 121R. However, the howling reduction may be collectively performed for both the channels. For example, when the level of either one of the channels exceeds the first threshold th, the howling reduction control is performed by decreasing the gain of the amplifier 24 for both the L channel and the R channel, or the like.

This control is applicable also to the second process.

The audio reproduction system according to the embodiments is a stereo audio reproduction system having the L channel and the R channel. However, the technology of the present disclosure is applicable to a monaural audio reproduction system, and an audio reproduction system having three or more channels, as well as the stereo audio reproduction system.

The program according to the embodiments is a program under which a computer apparatus executes: a process of analyzing a sound input via the microphones 6L and 6R, and selecting, from a plurality of control methods (e.g., the first process and the second process) on the basis of a result of the analysis, an audio signal characteristic control method for the audio processing unit 2 provided for inputting the sound via the microphones 6L and 6R and outputting the sound via the speakers 7L and 7R; and a process of performing audio signal characteristic control for the audio processing unit 2. In other words, the program according to the embodiments is a program under which a computer apparatus such as a microcomputer executes the processes in FIGS. 5, 8, and 9.

The controller 1 of the present embodiments can be easily implemented under the program thus provided.

Such a program may be stored in advance in a recording medium built in a device such as a computer apparatus, or a ROM (Read Only Memory) or the like within a microcomputer including a CPU (Central Processing Unit). Alternatively, the program may be temporarily or permanently retained (stored) in a removable recording medium such as a semiconductor memory, a memory card, an optical disk, a magneto-optical disk, and a magnetic disk. Moreover, such a removable recording medium may be provided as so-called package software.

Furthermore, such a program may be installed in a personal computer or the like from a removable recording medium, or downloaded from a download site via a network such as a LAN (Local Area Network) and the Internet.

Note that advantageous effects to be produced are not limited to the advantageous effects described in the present description and presented only by way of example, and may include other advantageous effects.

Note that the present technology may also have following configurations.

(1)

A controller including:

a characteristic control unit capable of selectively executing a plurality of control methods as an audio signal characteristic control method for an audio processing system provided for inputting a sound via a microphone and outputting the sound via a speaker; and an analysis unit that analyzes the sound input via the microphone, and selects a control method executed by the characteristic control unit for the audio processing system on the basis of an analysis result.

(2)

The controller according to (1) described above, in which the characteristic control unit is capable of selectively executing a plurality of audio signal characteristic control methods for howling reduction.

(3)

The controller according to (2) described above, in which the characteristic control unit is capable of executing at least a first process and a second process as the audio signal characteristic control method for howling reduction, the first process executes signal characteristic control for howling reduction in a condition where a detection level of an audio signal input via the microphone exceeds a first threshold, and the second process executes the signal characteristic control for howling reduction in a condition where a detection level of the audio signal input via the microphone exceeds a second threshold higher than the first threshold.

(4)

The controller according to (3) described above, in which the first process is a process that outputs an instruction for howling reduction to the audio processing system when the detection level exceeds the first threshold and is determined to have an increasing tendency.

(5)

The controller according to (3) or (4) described above, in which the second process is a process that outputs an instruction for howling reduction to the audio processing system in a case where the detection level exceeds the second threshold without detection of a level drop more than a predetermined level range for a predetermined period.

(6)

The controller according to any one of (3) to (5) described above, in which
the first process compares a signal level of a first band component of the audio signal input via the microphone with the first threshold, and
the second process compares a signal level of a second band component of the audio signal input via the microphone with the second threshold.

(7)

The controller according to (3) to (5) described above, in which
the first process compares a signal envelope level of a first band component of the audio signal input via the microphone with the first threshold, and
the second process compares a signal envelope level of a second band component of the audio signal input via the microphone with the second threshold.

(8)

The controller according to any one of (1) to (7) described above, in which
the analysis unit uses, for a selection process of selecting the control method performed by the characteristic control unit, a result of a comparison between an audio signal level input via the microphone and a noise determination threshold.

(9)

The controller according to any one of (1) to (7) described above, in which
the analysis unit uses, for a selection process of selecting the control method performed by the characteristic control unit, a result of a comparison between a signal level of a predetermined band component of the audio signal input via the microphone and a noise determination threshold.

(10)

The controller according to any one of (1) to (7) described above, in which
the analysis unit uses, for a selection process of selecting the control method performed by the characteristic control unit, a result of a comparison between a signal envelope level of a predetermined band component of the audio signal input via the microphone and a noise determination threshold.

(11)

The controller according to any one of (3) to (7) described above, in which
the analysis unit uses, for a selection process of selecting the first process and the second process performed by the characteristic control unit, a result of a comparison between an audio signal level input via the microphone and a noise determination threshold lower than the first threshold.

(12)

The controller according to (6) described above, in which
the analysis unit uses, for determination of switching from the first process to the second process by the characteristic control unit, a result of a comparison between a signal level of the first band component of the audio signal input via the microphone and a noise determination threshold.

(13)

The controller according to any one of (1) to (12) described above, in which
audio signals generated in a plurality of channels and obtained via a plurality of microphones are input to the analysis unit, and
the analysis unit issues an instruction for switching the control method of the characteristic control unit in a case where all of audio signal levels of respective channels exceed a noise determination threshold.

(14)

The controller according to any one of (1) to (13) described above, in which
audio signals generated in a plurality of channels and obtained via a plurality of microphones are input to the analysis unit, and
the analysis unit issues an instruction for switching the control method of the characteristic control unit in a case where all of audio signal levels of respective channels become equal to or lower than a noise determination threshold for a predetermined time or longer.

(15)

A control method executed by a controller, the method including:
a procedure of analyzing a sound input via a microphone, and selecting, from a plurality of control methods on the basis of a result of the analysis, an audio signal characteristic control method for an audio processing system provided for inputting the sound via the microphone and outputting the sound via a speaker; and
a procedure of performing audio signal characteristic control for the audio processing system using the selected control method.

(16)

A program under which a computer apparatus executes:
a process of analyzing a sound input via a microphone, and selecting, from a plurality of control methods on the basis of a result of the analysis, an audio signal characteristic control method for an audio processing system provided for inputting the sound via the microphone and outputting the sound via a speaker; and
a process of performing audio signal characteristic control for the audio processing system using the selected control method.

REFERENCE SIGNS LIST

1 . . . Controller, 2 . . . Audio processing unit, 3 . . . Sound source unit, 5L . . . L unit, 5R . . . R unit, 6L, 6R . . . Microphone, 7L, 7R . . . Speaker, 11 . . . Analysis unit, 12 . . . Characteristic control unit, 21 . . . Microphone amplifier, 22 . . . A/D converter, 23 . . . Filter, 24 . . . Amplifier, 25 . . . Addition unit, 26 . . . D/A converter, 27 . . . Drive circuit, 121 . . . First processing unit, 121L . . . L-channel processing unit, 121R . . . R-channel processing unit, 122 . . . Second processing unit, 122L . . . L-channel processing unit, 122R . . . R-channel processing unit, 100 . . . Headphone, 200 . . . Audio player

The invention claimed is:
1. A controller, comprising:
an analysis unit configured to:
analyze an audio signal input via a microphone; and
select an audio signal characteristic control method from a plurality of control methods based on a result of the analysis; and
a characteristic control unit configured to:
execute the selected audio signal characteristic control method for an audio processing system, wherein
the audio processing system receives the audio signal via the microphone and outputs the audio signal via a speaker, and
the analysis unit is further configured to switch the selected audio signal characteristic control method for the audio processing system based on a level of the audio signal that becomes equal to or less than a noise determination threshold for a specific time period.

2. The controller according to claim 1, wherein the characteristic control unit is further configured to execute the selected audio signal characteristic control method for howling reduction.

3. The controller according to claim 2, wherein the characteristic control unit is further configured to:
execute at least a first process or a second process as the audio signal characteristic control method for the howling reduction;
execute, in the first process, signal characteristic control for the howling reduction based on a detection level of the audio signal input via the microphone exceeds a first threshold; and
execute, in the second process, the signal characteristic control for the howling reduction based on the detection level of the audio signal input via the microphone exceeds a second threshold higher than the first threshold.

4. The controller according to claim 3, wherein in the first process,
the characteristic control unit is further configured to output an instruction for the howling reduction to the audio processing system, and
the instruction is output based on the detection level that exceeds the first threshold and is determined to have an increasing tendency.

5. The controller according to claim 3, wherein in the second process,
the characteristic control unit is further configured to output an instruction for the howling reduction to the audio processing system, and
the instruction is output based on the detection level exceeds the second threshold and a drop in the detection level is in a specific range for a specific period.

6. The controller according to claim 3, wherein the characteristic control unit is further configured to:
compare, in the first process, a signal level of a first band component of the audio signal input via the microphone with the first threshold; and
compare, in the second process, a signal level of a second band component of the audio signal input via the microphone with the second threshold.

7. The controller according to claim 6, wherein the analysis unit is further configured to:
compare a signal level of the first band component of the audio signal input via the microphone with the noise determination threshold; and
switch the first process to the second process based on a result of the comparison.

8. The controller according to claim 3, wherein the characteristic control unit is further configured to:
compare, in the first process, a signal envelope level of a first band component of the audio signal input via the microphone with the first threshold; and
compare, in the second process, a signal envelope level of a second band component of the audio signal input via the microphone with the second threshold.

9. The controller according to claim 3, wherein the analysis unit is further configured to:
compare a level of the audio signal input via the microphone with the noise determination threshold, wherein the noise determination threshold is lower than the first threshold; and
select, as the audio signal characteristic control method, at least one of the first process or the second process based on a result of the comparison.

10. The controller according to claim 1, wherein the analysis unit is further configured to:
compare the signal level of the audio signal input via the microphone with the noise determination threshold; and
select the audio signal characteristic control method based on a result of the comparison.

11. The controller according to claim 1, wherein the analysis unit is further configured to:
compare a signal level of a specific band component of the audio signal input via the microphone with the noise determination threshold; and
select the audio signal characteristic control method based on a result of the comparison.

12. The controller according to claim 1, wherein the analysis unit is further configured to:
compare a signal envelope level of a specific band component of the audio signal input via the microphone with the noise determination threshold; and
select the audio signal characteristic control method based on a result of the comparison.

13. The controller according to claim 1, wherein the analysis unit is further configured to:
obtain a plurality of audio signals input via a plurality of microphones, wherein the plurality of audio signals is generated in a plurality of channels; and
switch the selected audio signal characteristic control method of the characteristic control unit based on audio signal levels of respective channels exceed the noise determination threshold.

14. The controller according to claim 1, wherein the analysis unit is further configured to:
obtain a plurality of audio signals input via a plurality of microphones, wherein the plurality of audio signals is generated in a plurality of channels; and
switch the audio signal characteristic control method of the characteristic control unit based on audio signal levels of respective channels become equal to or lower than the noise determination threshold for at least the specific time period.

15. A control method, comprising:
in a controller:
analyzing an audio signal input via a microphone;
selecting, from a plurality of control methods based on a result of the analysis, an audio signal characteristic control method;
performing audio signal characteristic control for an audio processing system based on the selected audio signal characteristic control method, wherein the audio processing system receives the audio signal via the microphone and outputs the audio signal via a speaker; and
switching the selected audio signal characteristic control method for the audio processing system based on a level of the audio signal that becomes equal to or less than a noise determination threshold for a specific time period.

16. A non-transitory computer-readable medium having stored thereon computer-executable instructions which, when executed by a processor, cause the processor to execute operations, the operations comprising:
analyzing an audio signal input via a microphone;
selecting, from a plurality of control methods based on a result of the analysis, an audio signal characteristic control method;

performing audio signal characteristic control for an audio processing system based on the selected audio signal characteristic control method, wherein the audio processing system receives the audio signal via the microphone and outputs the audio signal via a speaker; and
switching the selected audio signal characteristic control method for the audio processing system based on a level of the audio signal that becomes equal to or less than a noise determination threshold for a specific time period.

* * * * *